United States Patent
Hyun et al.

(10) Patent No.: US 11,388,092 B2
(45) Date of Patent: Jul. 12, 2022

(54) PEER AND OPERATING METHOD THEREOF

(71) Applicant: ELECTRONICS AND TELECOMMUNICATIONS RESEARCH INSTITUTE, Daejeon (KR)

(72) Inventors: Wook Hyun, Sejong-si (KR); Mi Young Huh, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/991,266

(22) Filed: Aug. 12, 2020

(65) Prior Publication Data

US 2021/0099384 A1     Apr. 1, 2021

(30) Foreign Application Priority Data

Sep. 30, 2019   (KR) .................... 10-2019-0120652
Feb. 20, 2020   (KR) .................... 10-2020-0021161

(51) Int. Cl.
*H04L 45/00* (2022.01)
*H04L 45/64* (2022.01)
*H04L 12/44* (2006.01)
*H04L 43/106* (2022.01)
*H04L 67/104* (2022.01)

(52) U.S. Cl.
CPC .............. *H04L 45/70* (2013.01); *H04L 12/44* (2013.01); *H04L 43/106* (2013.01); *H04L 45/64* (2013.01); *H04L 67/104* (2013.01)

(58) Field of Classification Search
CPC ....... H04L 45/70; H04L 12/44; H04L 43/106; H04L 45/64; H04L 67/104
See application file for complete search history.

(56) References Cited

U.S. PATENT DOCUMENTS

| | | | |
|---|---|---|---|
| 8,179,801 B2* | 5/2012 | Previdi .................. | H04L 45/04 370/238 |
| 8,385,267 B2* | 2/2013 | Wu ......................... | H04L 45/64 370/328 |
| 8,588,233 B1* | 11/2013 | Lohner .............. | H04L 61/2589 370/392 |

(Continued)

FOREIGN PATENT DOCUMENTS

| KR | 10-0774787 B1 | 11/2007 |
|---|---|---|
| KR | 10-1035903 B1 | 5/2011 |
| KR | 10-1048016 B1 | 7/2011 |

*Primary Examiner* — Chandrahas B Patel
(74) *Attorney, Agent, or Firm* — LRK Patent Law Firm

(57) ABSTRACT

A peer may receive a peer list from a hybrid overlay management server in response to an overlay network participation request of the peer, may select a first peer from the received peer list, may establish a connection with the selected first peer, and may establish a connection with at least one of second peers. Propagation of the overlay network participation request may be initiated by the selected first peer, and each of the second peers may correspond to a peer that receives the propagated overlay network participation request. One of the established connections may be determined as a primary path, and a communication may be performed through the primary path.

12 Claims, 23 Drawing Sheets

Hybrid overlay network

(56) References Cited

U.S. PATENT DOCUMENTS

| | | | | |
|---|---|---|---|---|
| 9,137,027 B2 * | 9/2015 | Matthews | ............... | H04L 12/18 |
| 9,191,219 B2 * | 11/2015 | Kaufman | .............. | H04L 12/185 |
| 2008/0222277 A1 | 9/2008 | Park et al. | | |
| 2019/0124143 A1 | 4/2019 | Lee et al. | | |

* cited by examiner

PEER AND OPERATING METHOD THEREOF

CROSS-REFERENCE TO RELATED APPLICATION(S)

This application claims the benefit of Korean Patent Application No. 10-2019-0120652, filed on Sep. 30, 2019, and Korean Patent Application No. 10-2020-0021161, filed on Feb. 20, 2020, in the Korean Intellectual Property Office, the disclosures of which are incorporated herein by reference.

BACKGROUND

1. Field of the Invention

The following example embodiments relate to a peer.

2. Description of Related Art

An overlay network is a network constructed on top of an existing network based on the existing network, and refers to a virtual network including separate nodes and logical links on the existing network. The overlay network may provide more efficient network services by increasing scalability using the existing network.

SUMMARY

According to an aspect, there is provided an operating method of a peer, the operating method including receiving a peer list from a hybrid overlay management server in response to an overlay network participation request of the peer, selecting a first peer from the received peer list, establishing a connection with the selected first peer, establishing a connection with at least one of second peers, propagation of the overlay network participation request being initiated by the selected first peer, and each of the second peers corresponding to a peer that receives the propagated overlay network participation request, determining one of the established connections as a primary path; and performing a communication through the primary path.

The peer list may include peers determined based on a ticket identification (ID) assigned to each of peers remaining in an overlay network.

The ticket ID may correspond to an order in which each peer participates in the overlay network.

The establishing of the connection with the selected first peer may include transmitting a first request message to the selected first peer to provide a notification of participation in an overlay network, and receiving a success response to the first request message from the selected first peer and receiving a second request message to establish the connection from the selected first peer.

The first request message may include at least one of an identifier of the overlay network, a number of peers that are to propagate the first request message, a maximum number of connections of the peer, and address information of the peer.

The second request message may include at least one of the identifier of the overlay network, an identifier of the selected first peer, and a ticket ID of the selected first peer.

The first request message may be modified by the selected first peer, and the modified first request message may be transmitted to at least one peer connected via a primary path to the selected first peer.

A value of a first parameter in the modified first request message may be a value obtained by dividing a result obtained by subtracting a value of a first parameter in the first request message by a predetermined value by a number of peers connected via primary paths to the selected first peer.

The determining of the one of the established connections may include transmitting a probe message including a local timestamp of the peer to each of peers connected to the peer, receiving a response in which the local timestamp is embedded from each of the connected peers, calculating a time difference between a timestamp corresponding to a reception time of the received response and the local timestamp included in the received response, and determining the primary path based on the calculated time difference.

The operating method may further include, when a peer connected via a primary path to the peer is detected to leave, performing a recovery procedure so that an overlay network maintains a spanning tree form.

The performing of the recovery procedures may include, when a ticket ID of the peer is higher than a ticket ID of the detected peer, and when the peer has a plurality of outgoing candidate paths, transmitting a primary set message to a peer on an outgoing candidate path with a maximum performance among the outgoing candidate paths.

The performing of the recovery procedures may include, when the ticket ID of the peer is higher than the ticket ID of the detected peer, and when the peer does not have a plurality of outgoing candidate paths, sending a request for a second peer list to the hybrid overlay management server, selecting a third peer from the second peer list, transmitting a request message including a recovery field to the selected third peer, and establishing a connection with the selected third peer, establishing a connection with at least one of fourth peers, propagation of the request message including the recovery field being initiated by the selected third peer, and each of the fourth peers corresponding to a peer that receives the propagated request message including the recovery field, and determining one of the connection established with the selected third peer and the connection established with at least one of the fourth peers as a recovered primary path of the peer.

According to another aspect, there is provided a peer including a communicator, and a controller configured to receive a peer list from a hybrid overlay management server through the communicator in response to an overlay network participation request of the peer, to select a first peer from the received peer list, to establish a connection with the selected first peer, to establish a connection with at least one of second peers, and to determine one of the established connections as a primary path.

Propagation of the overlay network participation request may be initiated by the selected first peer, and each of the second peers may correspond to a peer that receives the propagated overlay network participation request.

The peer list may include peers determined based on a ticket ID assigned to each of peers remaining in an overlay network.

The ticket ID may correspond to an order in which each peer participates in the overlay network.

The controller may be configured to transmit a first request message to the selected first peer through the communicator to provide a notification of participation in an overlay network, to receive a success response to the first request message from the selected first peer through the communicator, and to receive a second request message to establish the connection from the selected first peer through the communicator.

The controller may be configured to perform a recovery procedure so that an overlay network maintains a spanning tree form when a peer connected via a primary path to the peer is detected to leave.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
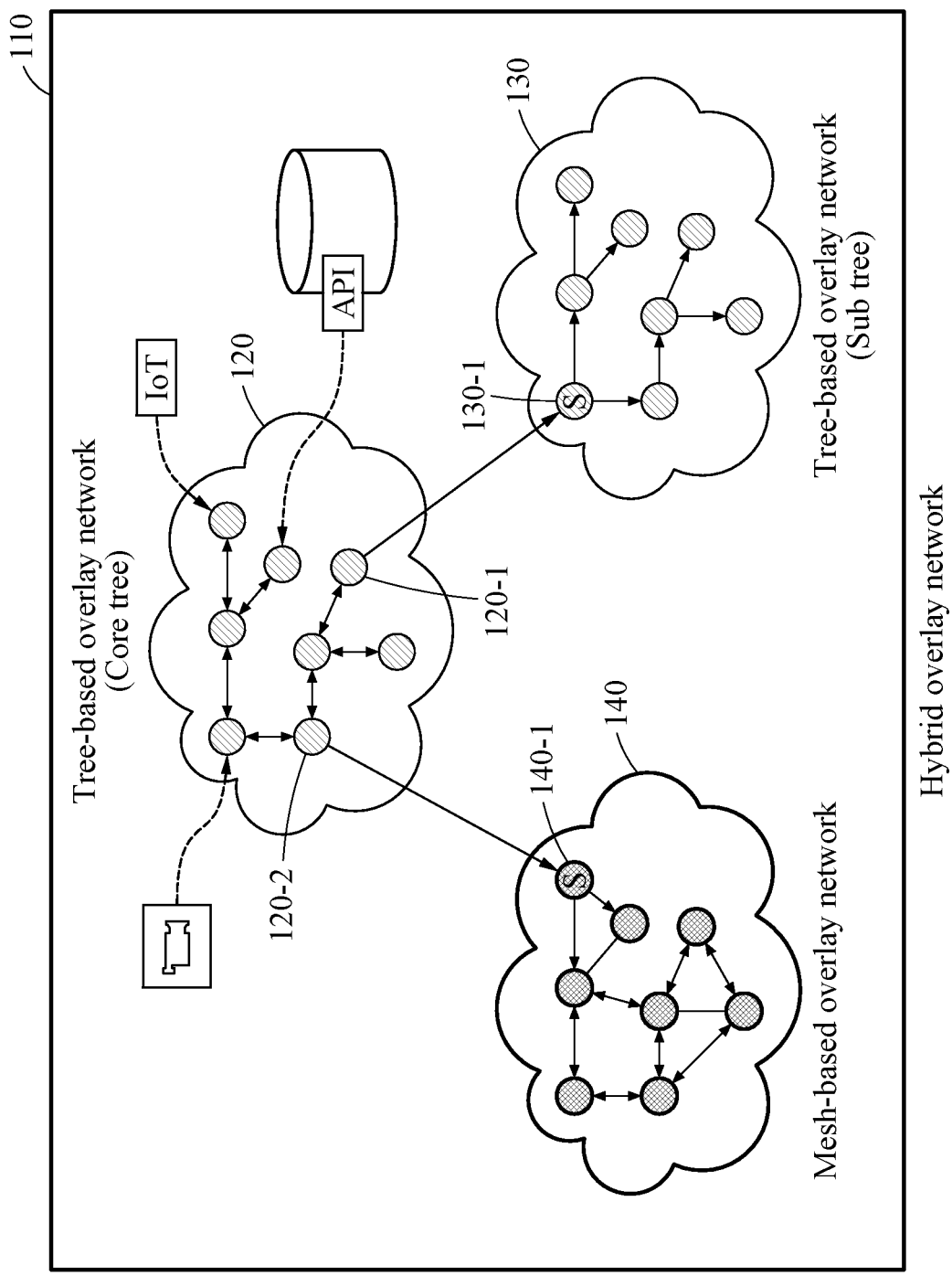
FIG. 1 is a diagram illustrating a hybrid overlay network according to an example embodiment.

Hereinafter, example embodiments will be described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. Terms defined in dictionaries generally used should be construed to have meanings matching with contextual meanings in the related art and are not to be construed as an ideal or excessively formal meaning unless otherwise defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, description made in one example embodiment may be applicable to another example embodiment and detailed description within a duplicate range is omitted.

FIG. 1 is a diagram illustrating a hybrid overlay network according to an example embodiment.

Referring to FIG. 1, a hybrid overlay network 110 according to an example embodiment includes a tree-based overlay network (core tree) 120, a tree-based overlay network (sub tree) 130, and a mesh-based overlay network 140. Depending on an implementation, the hybrid overlay network 110 may not include the tree-based overlay network (sub tree) 130.

Each of the tree-based overlay networks 120 and 130 may be used for a fast distribution of small data, and the mesh-based overlay network 140 may be used for a distribution of relatively large-sized data.

A peer 120-1 included in the tree-based overlay network 120 may transmit data to a peer 130-1 included in the tree-based overlay network 130. The peer 130-1 may operate as a source peer in the tree-based overlay network 130.

A peer 120-2 may transmit data to a peer 140-1 included in the mesh-based overlay network 140. The peer 140-1 may operate as a source peer in the mesh-based overlay network 140.

A shape of the hybrid overlay network 110 may change every time a new peer joins. Also, the hybrid overlay network 110 may guarantee that there is no loop in a path and may provide robustness against a failure of single or multiple node failures. For a fast recovery of an error, each peer may form multiple candidate paths in joining procedures, and may select one of the multiple candidate paths as a primary path. The primary path may be used to distribute data.

Figure 2:
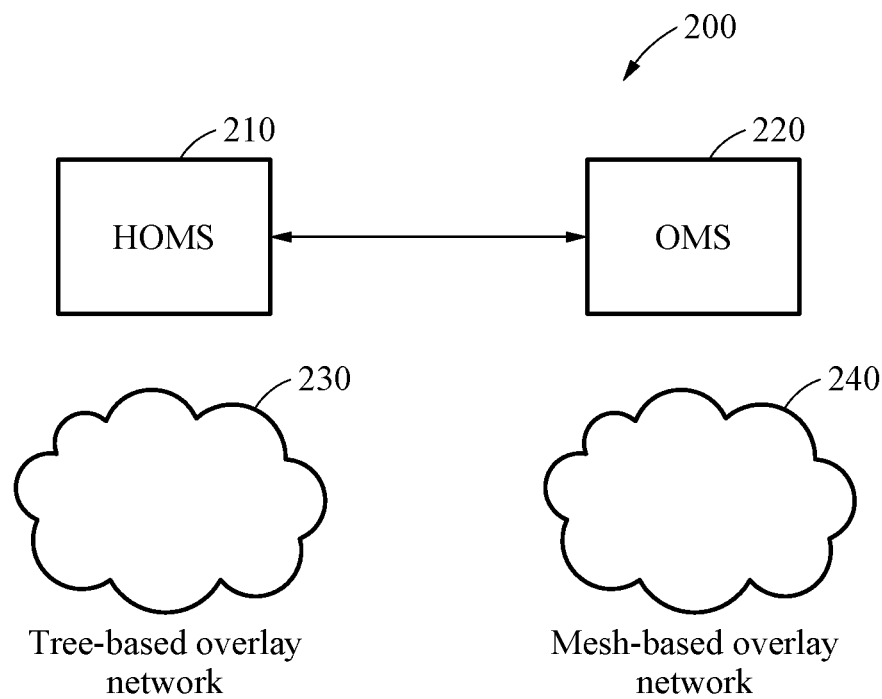
FIG. 2 is a diagram illustrating a hybrid peer-to-peer (P2P) network according to an example embodiment.

FIG. 2 is a diagram illustrating a hybrid peer-to-peer (P2P) network according to an example embodiment.

Referring to FIG. 2, a hybrid P2P network 200 includes a hybrid overlay management server (hereinafter, referred to as a "HOMS") 210, an overlay management server (hereinafter, referred to as an "OMS") 220, a tree-based overlay network 230, and a mesh-based overlay network 240. The tree-based overlay network 230 may correspond to one of the tree-based overlay networks 120 and 130 of FIG. 1, and the mesh-based overlay network 240 may correspond to the mesh-based overlay network 140 of FIG. 1.

The HOMS 210 may manage the tree-based overlay network 230 and the mesh-based overlay network 240.

The HOMS 210 may manage overlay network information generated by a peer, and may track a state of each of the tree-based overlay network 230 and the mesh-based overlay network 240 by receiving a report from at least one peer.

Depending on example embodiments, a peer may transmit a joining request to join the mesh-based overlay network 240 to the HOMS 210, and the HOMS 210 may forward the joining request to the OMS 220.

Figure 3:
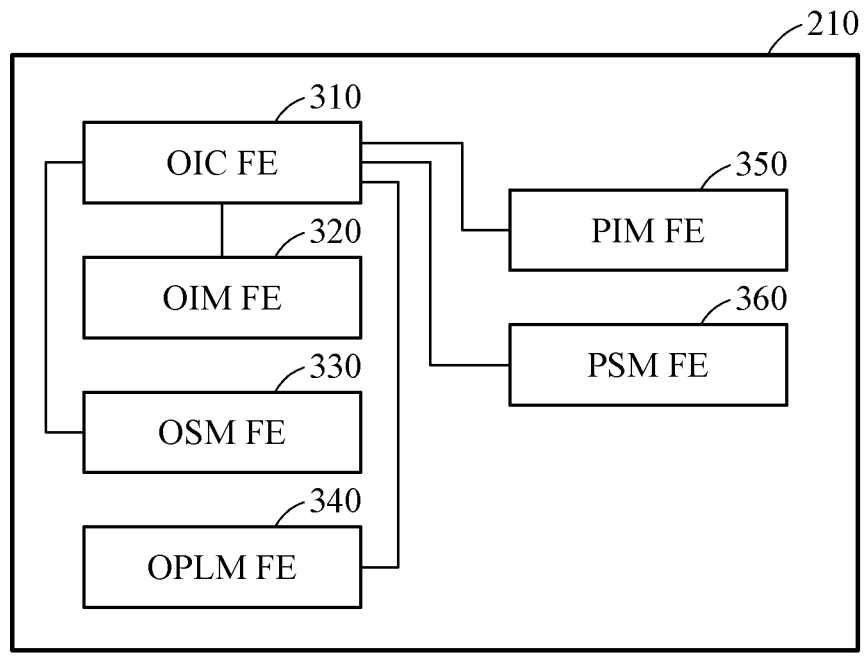
FIG. 3 is a diagram illustrating a HOMS according to an example embodiment.

FIG. 3 is a diagram illustrating a HOMS according to an example embodiment.

Referring to FIG. 3, the HOMS 210 includes an overlay interaction communication (OIC) functional entity (FE) 310, an overlay information management (OIM) FE 320, an overlay status management (OSM) FE 330, an overlay peer list management (OPLM) FE 340, a peer information management (PIM) FE 350, and a peer status management (PSM) FE 360.

The OIC FE 310 may interact with a peer to manipulate overlay information and collect status information. When the peer sends a request to create a new overlay network with appropriate information, the OIC FE 310 may interact with the OIM FE 320 to store information (for example, overlay information or overlay network information) after validation check. When a query request for a specific overlay network is received from a peer, the OIC FE 310 may interact with the OIM FE 320 and the PIM FE 350 to fetch related information, and may transmit the related information in a message format to the peer.

The OIM FE 320 may manage and provide overlay network information when a request is received from the OIC FE 310.

The OSM FE 330 may manage and provide overlay status information when a request is received from the OIC FE 310. The OSM FE 330 may provide information for an operation, administration and monitoring to an administrator.

The OPLM FE 340 may manage a peer list of each overlay network. When a peer transmits a join request to the OIC FE 310, the OIC FE 310 may transmit the peer and overlay information to the OPLM FE 340. The OPLM FE 340 may store the received peer and overlay information, and may provide the stored information in response to a reception of a query request from the peer. In particular, the OPLM FE 340 may provide an optimal peer list for a specific overlay network based on a type of an overlay network. The OPLM FE 340 may provide a random subset of a peer list for the mesh-based overlay network 240 and may provide a list of peers to be connected to the tree-based overlay network 230.

The PIM FE 350 may manage peer information registered by a joining peer. When a peer joins a specific overlay network, the peer may transmit a message including peer information together with overlay network information to the OIC FE 310. The OIC FE 310 may transmit the received information to the PIM FE 350.

The PSM FE 360 may receive report messages from peers and may manage statuses of corresponding peers. When a peer disappears without appropriate leaving procedures, another peer that detects a loss of the peer may transmit a report message to the PSM FE 360 through the OIC FE 310.

Figure 4A:
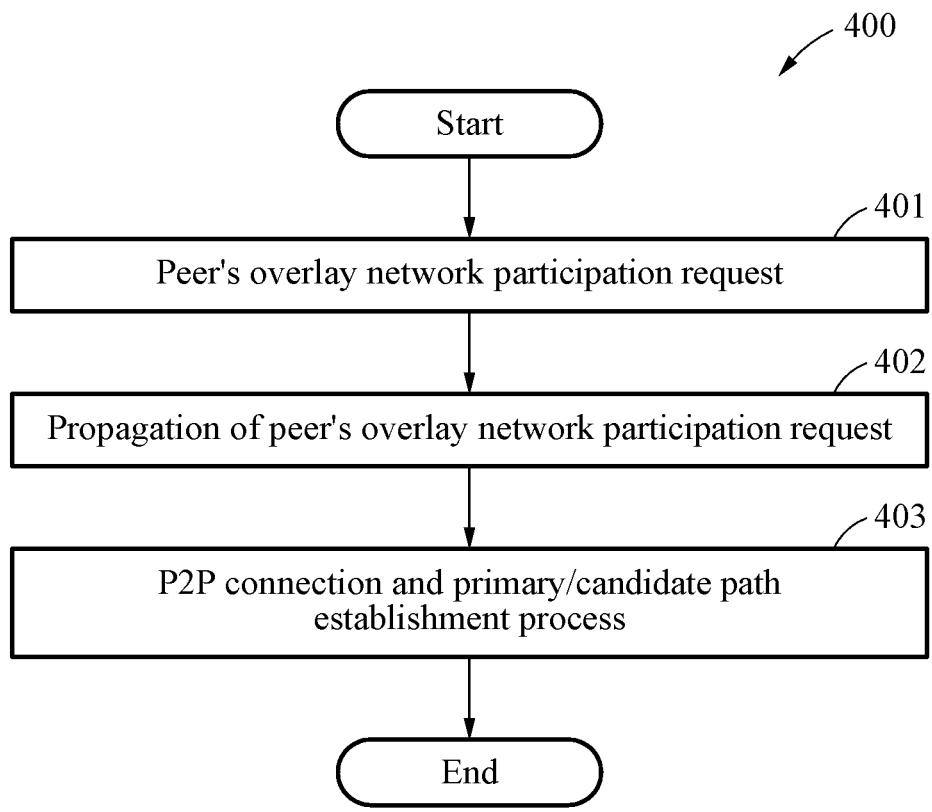
FIGS. 4A through 5 illustrate a construction of a hybrid P2P network according to an example embodiment.
Figure 4B:
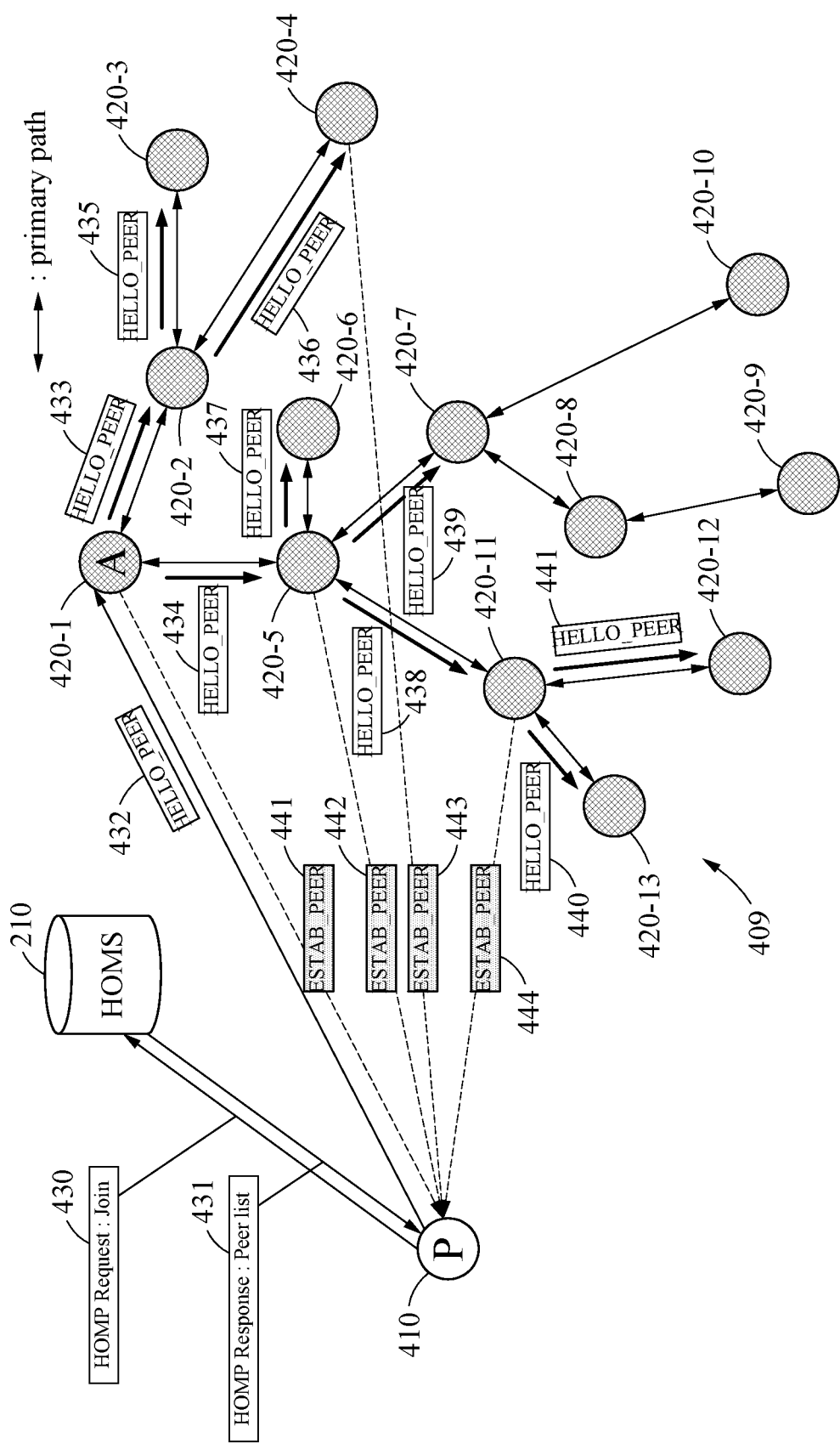
Figure 5:
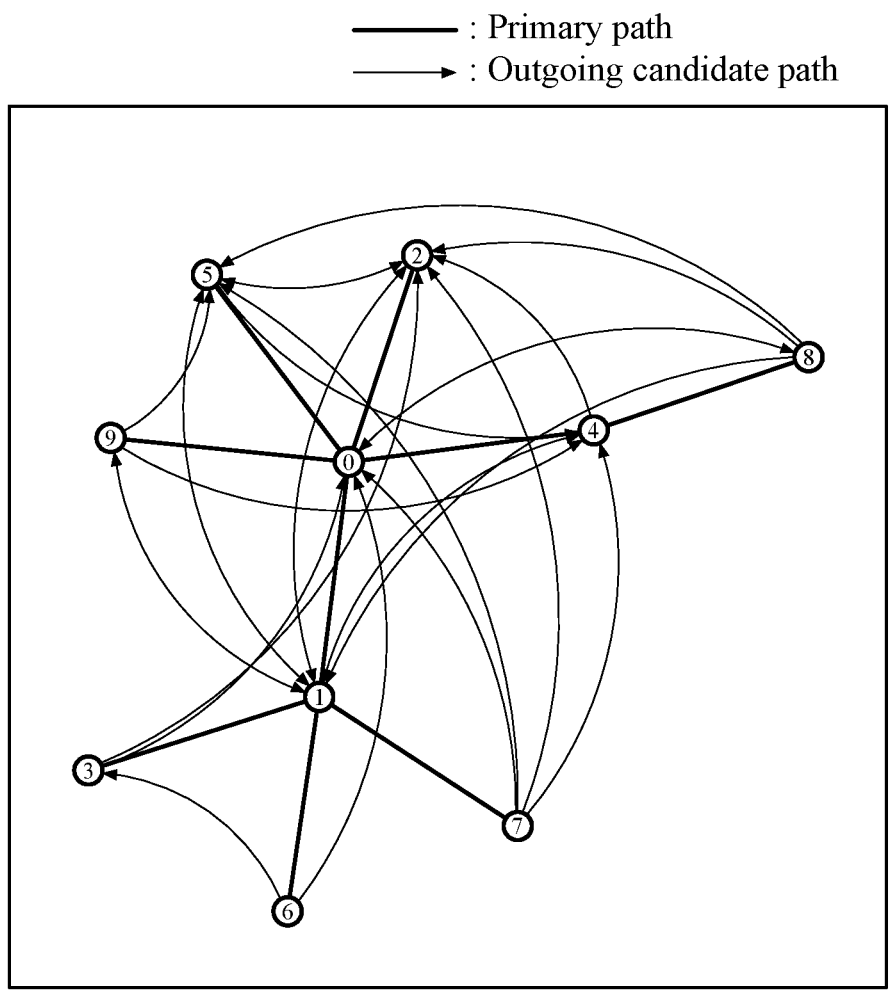

FIGS. 4A through 5 illustrate a construction of a hybrid P2P network according to an example embodiment.

Referring to FIG. 4A, a construction 400 of the hybrid P2P network 200 (or the tree-based overlay network 230) may be achieved through a peer's overlay network participation request 401, propagation 402 of the peer's overlay network participation request, and a P2P connection and primary/candidate path establishment process 403. The construction 400 of the hybrid P2P network 200 (or the tree-based overlay network 230) will be further described below with reference to FIG. 4B.

<Operation 401: Peer's Overlay Network Participation Request>

An overlay network 409 shown in FIG. 4B is represented as a hybrid overlay network for convenience of description, but may be represented as a tree-based overlay network.

When a new peer 410 participates in the hybrid overlay network 409, the peer 410 transmits a hybrid overlay management protocol (hereinafter, referred to as a "HOMP") request message to the HOMS 210 in operation 430. The HOMP request message may include at least one of an identifier of the peer 410, address information of the peer 410, and authentication information. The address information may describe a network address at which the peer 410 is accessible by other peers, and may include information required for connection establishment. The information required for connection establishment may include, but is not limited to, for example, at least one of a transport scheme (for example, TCP, or Web Real-Time Communication (WebRTC)), a peer identifier, and a transmission port number.

When the HOMP request message is received from the peer 410, the HOMS 210 provides a response to the peer 410 in operation 431. Here, the response may include an appropriate peer list including participants of the hybrid overlay network 409. Also, the HOMS 210 may issue a new ticket identification (ID) to the peer 410. Here, the ticket ID is related to an order of participation of the peer 410. A ticket ID of each of peers 420-1 to 420-13 is already issued by the HOMS 210. In other words, the HOMS 210 may issue ticket IDs in the order in which the peers 420-1 to 420-13 participate in the hybrid overlay network 409. Thus, the HOMS 210 may verify the order of participation of the peers 420-1 to 420-13.

The above ticket ID issuance procedure may allow the peers 420-1 to 420-13 and 410 to have a unique ticket ID that may be used in the hybrid overlay network 409, and a balanced tree shape.

When the HOMS 210 provides a peer list with a low ticket ID to the peer 410, a probability that the peer 410 is incapable of being attached to a network due to exhaustion of available resources of peers included in the peer list may be high. When the HOMS 210 provides a peer list with a latest ticket ID to the peer 410, a joining procedure may fail because peers included in the peer list are not yet attached to a tree (i.e., the hybrid overlay network 409). Thus, it may be important to provide a peer list with an appropriate order in a ticket ID queue to the peer 410.

In an example embodiment, when the peer 410 participates in the hybrid overlay network 409 as a T-th turn, the HOMS 210 may generate a peer list according to Rule 1 shown below.

[Rule 1]

entry peer list = [
    PI[ROUND(M x Rj/100)],
    PI[ROUND(M x Rj/100)+1],
    ...
    PI[ROUND(M x Rj/100)+K]
]

Since the peer 410 participates in the hybrid overlay network 409 as the T-th turn, T denotes a ticket ID for the peer 410.

PI denotes a set of peers currently remaining in the hybrid overlay network 409, and may be sorted by a ticket ID issued to each peer.

M denotes a number of peers currently remaining in the hybrid overlay network 409.

Rj expresses a relative position of M by percentage (%) and may be adjusted based on a configuration value of the HOMS 210 by an administrator. For example, when "100" peers are currently participating in the hybrid overlay network 409 (that is, M=100) and when a value of Rj is "80", PI[80] may indicate a peer located at an 80-th position, or a peer participating in the hybrid overlay network 409 as an 80-th turn.

K denotes a maximum number of peers that need to be included in a peer list, and is expressed as a percentage of a total number of peers. A default value of K may be, for example, "80". This is because of distribution of a load among recently attached peers. In an example, if M=100, Rj=80, and K=10, an entry peer list may be [PI[80], PI[81], PI[82], PI[83], PI[84], PI[85], PI[86], PI[87], PI[88], PI[89], PI[90]] according to Rule 1. In other words, the entry peer list may include a peer located at an 80-th position through a peer located at a 90-th position among "100" peers.

The HOMS 210 may transmit the generated peer list and a ticket ID T to the peer 410, and may record related information including an identifier of the peer 410 in a storage, such as an internal database. Also, the HOMS 210 may memorize a last issued ticket ID "T" so that subsequent numbers of the last issued ticket ID "T" may be used by further participating peers.

<Operation 402: Propagation of Peer's Overlay Network Participation Request>

When the peer list and ticket ID are received by the peer 410 from the HOMS 210, the peer 410 may select an appropriate peer from the peer list, and may transmit a request message to the selected peer. In FIG. 4B, the peer 410 may select the peer 420-1 from the peer list and may transmit a HELLO_PEER request message to the peer 420-1 in operation 432. To inform other peers of participation of the peer 410, the peer 410 may transmit the HELLO_PEER request message to the peer 420-1.

The peer 410 may attempt to connect to the peer 420-1. When a connection with the peer 420-1 fails, the peer 410 may select a next peer from the peer list.

When the connection with the peer 420-1 is successful, the peer 410 may not attempt to transmit the HELLO_PEER request message any more. Examples of parameters included in the HELLO_PEER request message are shown in Table 1 below.

TABLE 1

| Parameter | Description |
|---|---|
| overlay-id | describes an overlay identifier |
| time to live (TTL) | describes how many peers will propagate HELLO_PEER request messages |
| conn_num | describes a maximum number of connections with other peers that the peer 410 wants to establish |
| address | describes network address information allowing other peers to access the peer 410 |

The HELLO_PEER request message may include all the parameters shown in Table 1. Depending on an implementation, at least one of the parameters in Table 1 may not be included in the HELLO_PEER request message.

When the HELLO_PEER request message is received, the peer 420-1 may transmit a success response to the peer 410 and may add connection information to an incoming candidate path list of the peer 420-1. When the success response is received from the peer 420-1, the peer 410 may add connection information to an outgoing candidate path list of the peer 410. The connection information may include information about a connection between the peers 420-1 and 410, or information indicating that the peers 420-1 and 410 are connected.

When the peer 420-1 has available resources, the peer 420-1 may transmit an ESTAB_PEER request message to the peer 410 in operation 441. The ESTAB_PEER request message may include, for example, at least one of an overlay ID, a peer ID, and a ticket ID. In FIG. 4B, when the peer 420-1 has a capacity of accommodating a connection with the peer 410, the peer 420-1 may transmit an ESTAB_PEER request message including an overlay ID, an ID of the peer 420-1 and a ticket ID of the peer 420-1 to the peer 410. Here, the peer 420-1 may be connected to the peer 410 using an address included in the HELLO_PEER request message. For example, when the above connection succeeds, the peer 420-1 may increment a connection number by "1". When the connection fails, the peer 420-1 may ignore the connection.

In example embodiments, to prevent an overhead, each of the peers 420-1 to 420-13 may maintain information in Table 2 or 3 shown below. To calculate an availability of each of the peers 420-1 to 420-13, the information in Table 2 or 3 may be used.

TABLE 2

Number of maximum/current primary paths
Number of incoming/current candidate paths
Number of outgoing/current candidate paths

TABLE 3

Maximum number of acceptable primary connections
Maximum number of acceptable incoming candidate connections
Maximum number of acceptable outgoing candidate connections
Number of current primary connections
Number of current incoming connections (or number of current incoming candidate connections)
Number of current outgoing connections (or number of current outgoing candidate connections)

The peer 420-1 may transmit HELLO_PEER request messages to peers 420-2 and 420-5 connected via primary paths to the peer 420-1 in operations 433 and 434. The peer 420-1 may modify the HELLO_PEER request message of the peer 410 before transmitting the HELLO_PEER request messages to the peers 420-2 and 420-5. In an example, when a value of ttl in a HELLO_PEER request message is not zero, the peer 420-1 may decrement the value of the ttl. For example, when ttl in a HELLO_PEER request message has a value of zero, the peer 420-1 may discard the HELLO_PEER request message, instead of transmitting the HELLO_PEER request message to the peers 420-2 and 420-5. Also, since the connection with the peer 410 is established, the peer 420-1 may describe, in a HELLO_PEER request message received from the peer 410, a value obtained by subtracting a value of conn_num in the HELLO_PEER request message by "1" and dividing a "value of conn_num−1" by a number of peers (for example, the peers 420-2 and 420-5) connected via primary paths. When a value of conn_num in a HELLO_PEER request message received from the peer 410 is N, N may be replaced with (N−1)/2, and a HELLO_PEER request message including an overlay ID, (N−1)/2, ttl−1, and an address of the peer 410 may be transmitted to the peers 420-2 and 420-5.

When the HELLO_PEER request message is received from the peer 420-1, the peer 420-2 may verify whether resources of the peer 420-2 are available. Since there is no available resource in the peer 420-2 in FIG. 4B, the peer 420-2 may not transmit an ESTAB_PEER request message to the peer 410. In other words, the peer 420-2 may not establish a connection with the peer 410.

The peer 420-2 may modify the HELLO_PEER request message received from the peer 420-1 and may transmit the modified HELLO_PEER request message to peers 420-3 and 420-4 connected via primary paths to the peer 420-2 in operations 435 and 436. In other words, the peer 420-2 may subtract a value of ttl−1 in the HELLO_PEER request message received from the peer 420-1 by "1". However, since a connection between the peers 410 and 420-2 is not established, the peer 420-2 may divide (N−1)/2 in the HELLO_PEER request message received from the peer 420-1 by "2" that is a number of the peers 420-3 and 420-4 connected via the primary paths, instead of subtracting "1" from (N−1)/2. Thus, the peer 420-2 may transmit a HELLO_PEER request message including an overlay ID, ((N−1)/2)/2, ttl−2, and the address of the peer 410 to each of the peers 420-3 and 420-4.

Since there is no child peer of the peers 420-3 and 420-4 in FIG. 4B, each of the peers 420-3 and 420-4 may not propagate the HELLO_PEER request message. Also, since the peer 420-4 has available resources, the peer 420-4 may transmit an ESTAB_PEER request message to the peer 410 in operation 443.

When the HELLO_PEER request message is received from the peer 420-1, the peer 420-5 may verify whether resources of the peer 420-5 are available. Since the peer 420-5 has available resources in FIG. 4B, the peer 420-5 may transmit an ESTAB_PEER request message to the peer 410 in operation 442.

The peer 420-5 may modify the HELLO_PEER request message received from the peer 420-1, and may transmit the modified HELLO_PEER request message to peers 420-6, 420-7 and 420-11 connected via primary paths to the peer 420-5 in operations 437, 438 and 439. In other words, the peer 420-5 may subtract a value of ttl−1 in the HELLO_PEER request message received from the peer 420-1 by "1". Also, since a connection between the peers 410 and 420-5 is established, the peer 420-5 may subtract "1" from (N−1)/2 in the HELLO_PEER request message received from the peer 420-1, and may divide ((N−1)/2)−1 by "3" that is a number of the peers 420-6, 420-7 and 420-11 connected via the primary paths. Thus, the peer 420-5 may transmit a HELLO_PEER request message including an overlay ID, (((N−1)/2)−1)/3, ttl−2, and the address of the peer 410 to each of the peers 420-6, 420-7 and 420-11.

When the HELLO_PEER request message is received from the peer 420-5, the peer 420-11 may verify whether resources of the peer 420-11 are available. Since the peer 420-11 has available resources in FIG. 4B, the peer 420-11 may transmit an ESTAB_PEER request message to the peer 410 in operation 444.

The peer 420-11 may modify the HELLO_PEER request message received from the peer 420-5, and may transmit the modified HELLO_PEER request message to peers 420-12 and 420-13 connected via primary paths to the peer 420-11 in operations 440 and 441. In other words, the peer 420-11 may subtract a value of ttl−2 in the HELLO_PEER request message received from the peer 420-5 by "1". Also, since a connection between the peers 410 and 420-11 is established, the peer 420-11 may subtract "1" from (((N−1)/2)−1)/3 in the HELLO_PEER request message received from the peer 420-5, and may divide (((N−1)/2)−1)/3−1 by "2" that is a number of the peers 420-12 and 420-13 connected via the primary paths. Thus, the peer 420-11 may transmit a HELLO_PEER request message including an overlay ID, ((((N−1)/2)−1)/3−1)/2, ttl−3, and the address of the peer 410 to each of the peers 420-12 and 420-13.

Although not shown in FIG. 4B, the peer 420-7 may modify the HELLO_PEER request message received from the peer 420-5 and may transmit the modified HELLO_PEER request messages to peers 420-8 and 420-9 connected via primary paths to the peer 420-7.

By the above scheme, an overlay network participation request of the peer 410 may propagate to the peers 420-1 to 420-13 in the hybrid overlay network 409, and the peer 410 may receive the ESTAB_PEER request messages from the peers 420-1, 420-4, 420-5, and 420-11 among the peers 420-1 to 420-13 in the hybrid overlay network 409.

<Operation 403: P2P Connection and Primary/Candidate Path Establishment Process>

When the ESTAB_PEER request messages are received from the peers 420-1, 420-4, 420-5, and 420-11, the peer 410 may notify the peers 420-1, 420-4, 420-5, and 420-11 that connections are established, by sending responses to the peers 420-1, 420-4, 420-5, and 420-11.

The peer 410 may transmit a PROBE_PEER message (or a probe message) to each of the peers 420-1, 420-4, 420-5, and 420-11, and may measure or calculate a transmission speed between the peer 410 and each of the peers 420-1, 420-4, 420-5, and 420-11. The PROBE_PEER message includes a timestamp field, and a network time protocol (NTP) time value or a local system time value of the peer 410 may be recorded by the peer 410 in the timestamp field. In an example, the peer 410 may insert a local timestamp into the probe message and may transmit the probe message to each of the peers 420-1, 420-4, 420-5, and 420-11. When the probe message is received from the peer 410, each of the peers 420-1, 420-4, 420-5, and 420-11 may respond to the peer 410 with the local timestamp embedded in the probe message. In other words, each of the peers 420-1, 420-4, 420-5, and 420-11 may include the local timestamp embedded in the probe message in a response message, and may transmit the response message to the peer 410. The peer 410 may calculate a difference between the local timestamp included in the response message received from each of the peers 420-1, 420-4, 420-5, and 420-11 and a current time (for example, a current system/NTP time of the peer 410), and may measure or calculate a value of the transmission speed (or a transmission time value) between the peer 410 and each of the peers 420-1, 420-4, 420-5, and 420-11, based on the calculated difference.

The peer 410 may transmit a SET_PRIMARY message to a peer with a highest transmission speed among calculated values of transmission rates (or transmission time values). In other words, the peer 410 may transmit a SET_PRIMARY message to a most appropriate peer among the peers 420-1, 420-4, 420-5, and 420-11, to form a primary path. The peer 410 may transmit SET_CANDIDATE messages to the other peers.

An example of a tree-based overlay network constructed by ten peers through operations 401 through 403 is shown in FIG. 5. In other words, a tree-based overlay network such as a topology shown in FIG. 5 may be constructed. In FIG. 5, a number assigned to each of the ten peers represents a ticket ID.

Figure 6:
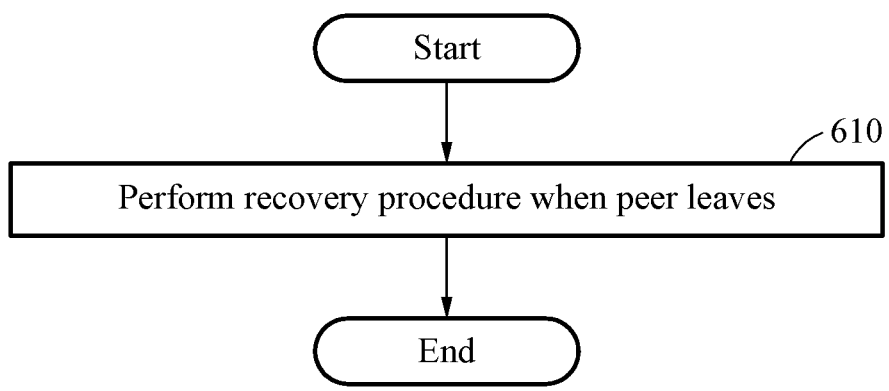
FIGS. 6 and 7 illustrate a recovery procedure according to an example embodiment.
Figure 7:
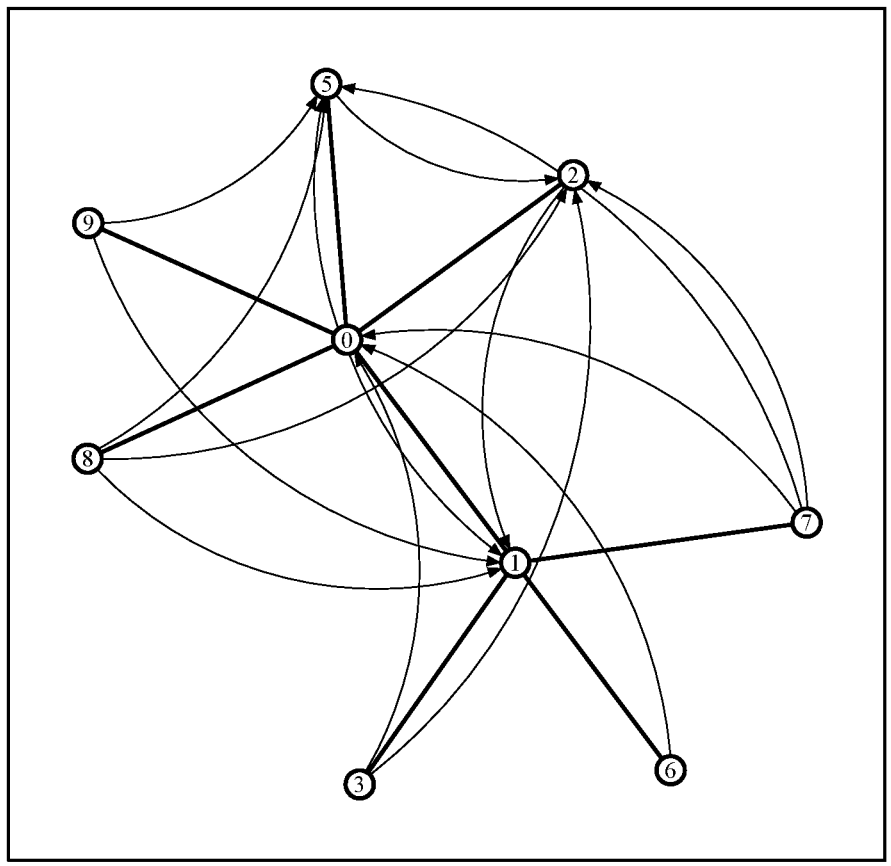

FIGS. 6 and 7 illustrate a recovery procedure according to an example embodiment.

Referring to FIG. 6, in operation 610, a hybrid P2P network performs a recovery procedure when a peer leaves.

An overlay network may need to be constructed as a kind of a spanning tree and a loop may not need to be generated. Also, characteristics may need to be maintained even though a new peer joins and an existing peer leaves. Thus, the overlay network may need to be recovered as soon as possible in response to an occurrence of an event, for example, departure of an existing peer or abnormal termination.

When an existing peer, for example, a peer Pj, wants to leave, the peer Pj may transmit LEAVE_PEER messages to primary peers connected to the peer Pj. Here, the primary peers may refer to peers connected to the peer Pj via primary paths.

When the LEAVE_PEER messages are received from the peer Pj, the primary peers may transmit response messages to the peer Pj, and may be disconnected from the peer Pj. Hereinafter, subsequent operations will be described based on a peer Pp that is one of the primary peers connected to the peer Pj.

When a ticket ID of the peer Pp is lower than a ticket ID of the peer Pj by comparing the ticket IDs of the peers Pp and Pj, the peer Pp may not perform a separate operation. When the ticket ID of the peer Pp is higher than the ticket ID of the peer Pj (that is, when the peer Pp participates in the overlay network later than the peer Pj), the peer Pp may perform a recovery process.

When the peer Pp has outgoing candidate paths, the peer Pp may transmit a SET_PRIMARY message to a peer on a candidate path with an excellent performance.

A peer receiving the SET_PRIMARY message from the peer Pp may transmit a response message corresponding to a success to the peer Pp. For example, when there is no outgoing candidate path or an outgoing candidate path is already exhausted in the peer Pp, the peer Pp may request the HOMS 210 to send a list of peers that participate in the overlay network earlier than the peer Pp. In this example, the peer Pp may also transmit its ticket ID to the HOMS 210. The HOMS 210 may generate a peer list according to Rule 2 shown below.

[Rule 2]

entry peer list = [
    PI[ROUND(M x Rr/100)],
    PI[ROUND(M x Rr/100)+1],
    ...
    PI[ROUND(M x Rr/100)+K]
]

Rr denotes a value used for a recovery. For example, when Rj of Rule 1 is "80", Rr may be "20". Accordingly, the HOMS 210 may add the bottom 80% of peers based on ticket IDs to a peer list when a new peer participates, and may add the top 20% of peers based on the ticket IDs to the peer list in a recovery process.

The HOMS 210 may transmit the peer list to the peer Pp. For example, when there is no peer participating in the overlay network before the peer Pp, the HOMS 210 may notify that the peer Pp is the last peer participating in the overlay network, through an empty list or an error message, and may not perform an additional operation.

When the peer list is received from the HOMS 210, the peer Pp may perform the same operation as that of the peer 410 described above with reference to operation 402. In an example, the peer Pp may select a peer from the received peer list. Also, the peer Pp may add a recovery field to a HELLO_PEER request message, may set the recovery field to "true", and may transmit the HELLO_PEER request message including the recovery field set to "true" to the selected peer. In other words, the peer Pp may notify the selected peer that the HELLO_PEER request message is a message for recovery.

A peer (hereinafter, referred to as a "peer x") that receives the HELLO_PEER request message from the peer Pp may add connection information to its incoming candidate path list. The connection information may include, for example, information about a connection between the peers x and Pp, or information indicating that a connection between the peers x and Pp is set. For example, when the incoming candidate path list of the peer x is full, the peer x may disconnect from a peer having a lowest ticket ID that is lower than a ticket ID of the peer x, and may add the connection information to the incoming candidate path list.

An example of a recovered overlay network when a peer with a ticket ID of 4 leaves the overlay network of FIG. 5 is shown in FIG. 7. For convenience of description, a peer with a ticket ID of 4 is expressed as a peer 4.

In the example of FIG. 5, peers 0 and 8 connected via primary paths to the peer 4 may detect an event. Here, the peer 0 may refer to a peer with a ticket ID of 0, the peer 8 may refer to a peer with a ticket ID of 8, and the event may occur by timeout of the peer 4 or an explicit release message from the peer 4.

Since the ticket ID of the peer 0 is lower than the ticket ID of the peer 4, the peer 0 may not perform a separate operation.

Since the peer 4 with the ticket ID is higher than that of the peer 8 leaves, the peer 8 may transmit a SET_PRIMARY message to the peer 0 to recover the primary path. Also, the peer 8 may change a candidate path between the peers 0 and 8 to the primary path.

Figure 8:
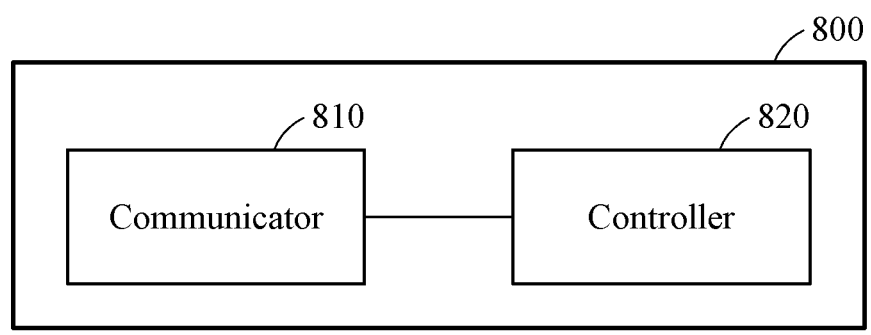
FIG. 8 is a block diagram illustrating a peer according to an example embodiment.

FIG. 8 is a block diagram illustrating a peer according to an example embodiment.

A peer may be represented as, for example, a node.

Referring to FIG. 8, a peer 800 includes a communicator 810 and a controller 820.

The communicator 810 may include hardware or a module for a wired communication or a wireless communication.

The controller 820 may receive a peer list from the HOMS 210 through the communicator 810, in response to an overlay network participation request to participate in an overlay network (for example, the hybrid overlay network 409 or the tree-based overlay network 230) being received from the peer 800. The peer list may include peers determined based on a ticket ID assigned to each of peers remaining in the overlay network.

The controller 820 may select a first peer from the received peer list, and may establish a connection with the selected first peer. In an example, the controller 820 may transmit a first request message to the selected first peer through the communicator 810 to inform that the peer 800 participates in the overlay network, and may receive a success response to the first request message from the selected first peer through the communicator 810. In this example, the first request message may correspond to the above-described HELLO_PEER request message. The first request message may include, for example, at least one of an identifier of an overlay network, a number of peers that are to propagate the first request message, a maximum number of connections of the peer 800, and address information of the peer 800. Also, the controller 820 may receive a second request message to establish a connection from the selected first peer. Here, the second request message may correspond to the above-described ESTAB_PEER request message. The second request message may include, for example, at least one of an identifier of an overlay network, an identifier of the selected first peer, and a ticket ID of the selected first peer.

Propagation of the overlay network participation request of the peer 800 may be initiated by the selected first peer. The selected first peer may modify the first request message, and may transmit the modified first request message to at least one peer connected via a primary path to the selected first peer. A value of a first parameter (for example, conn_num) included in the modified first request message may be a value obtained by dividing a result obtained by subtracting a value of a first parameter (for example, conn_num) included in the first request message that is not modified by a predetermined value (for example, "1") by a number of peers connected via primary paths to the selected first peer. In an example, when the value of conn_num in the first request message that is not modified is N, when the selected first peer establishes a connection with the peer 800, and when the number of peers connected via primary paths to the selected first peer is P, the value of conn_num in the modified first request message may be "(N−1)/P". In another example, when the value of conn_num in the first request message that is not modified is N, when the selected first peer does not establish a connection with the peer 800, and when the number of peers connected via primary paths to the selected first peer is P, the value of conn_num in the modified first request message may be "N/P".

The controller 820 may establish a connection with at least one of second peers through the communicator 810. Here, each of the second peers may correspond to a peer that receives the propagated overlay network participation request of the peer 800. In an example, a peer having available resources among the second peers may transmit an ESTAB_PEER request message to the peer 800 and may establish a connection with the peer 800.

The controller 820 may determine one of the established connections as a primary path. In an example, the controller 820 may transmit a probe message including a local timestamp of the peer 800 to each of peers connected to the peer 800 through the communicator 810, and may receive a response in which the local timestamp is embedded from each of the peers connected to the peer 800. The controller 820 may calculate a time difference between a timestamp corresponding to a reception time of each response and a local timestamp included in each response, and may determine a primary path based on the calculated time difference.

The controller 820 may perform a communication using the determined primary path. In an example, the controller 820 may transmit or receive data to or from a peer on the determined primary path through the communicator 810.

In example embodiments, when a peer connected via a primary path to the peer 800 is detected to leave, the peer 800 may perform a recovery procedure so that the overlay network may maintain a spanning tree form.

In an example, when a ticket ID of the peer 800 is higher than a ticket ID of the detected peer, and when the peer 800 has a plurality of outgoing candidate paths, the peer 800 may transmit a primary set message to a peer on an outgoing candidate path with a maximum performance among the outgoing candidate paths. In this example, the maximum performance may be related to the above-described time difference, or transmission speed.

In another example, when the ticket ID of the peer 800 is higher than the ticket ID of the detected peer, and when the peer 800 does not have a plurality of outgoing candidate paths, the peer 800 may send a request for another peer list to the HOMS 210. The HOMS 210 may generate another peer list according to the above-described Rule 2, and may transmit the other peer list to the peer 800. When the other peer list is received from the HOMS 210, the peer 800 may select a third peer from the other peer list, may transmit a request message (for example, a HELLO_PEER request message including a recovery field) including a recovery field to the selected third peer, and may establish a connection with the selected third peer. Propagation of the request message including the recovery field may be initiated by the selected third peer. Also, the peer 800 may establish a connection with at least one of fourth peers. Here, each of the fourth peers may correspond to a peer to which the request message including the recovery field is propagated. The peer 800 may determine one of the connection with the selected third peer and the connection with at least one of fourth peers as a recovered primary path of the peer 800. Thus, the overlay network may be quickly recovered even though a specific peer leaves.

According to an example embodiment, a stable tree-based overlay network robust against an error may be constructed.

Also, according to an example embodiment, a tree-based overlay network may be quickly and stably constructed through a self-construction scheme between peers without a control of a server. Thus, it is possible to guarantee a loop-free spanning tree and to secure a higher scalability than that of the existing tree-based overlay network.

Also, according to an example embodiment, when an error between peers occurs, the error may be automatically and stably recovered within a shortest period of time, and an issue of a failure of an intermediate node of the existing tree-based overlay network may be solved.

Also, according to an example embodiment, a hybrid overlay network (or a hybrid P2P network) may provide quick data propagation of a tree structure and scalability/stability of a mesh structure.

Also, according to an example embodiment, a tree topology asynchronization problem may be solved through a self-recovery method without a control of a server in a recovery process.

Also, according to an example embodiment, it may be possible to collect and distribute Internet of Things (IoT) data with real-time/non-real-time characteristics by solving large-scale simultaneous terminal access/user acceptance and server bottlenecks.

The description of FIGS. 1 to 7 is also applicable to the description of FIG. 8, and thus further description thereof is not repeated herein.

Figure 9:
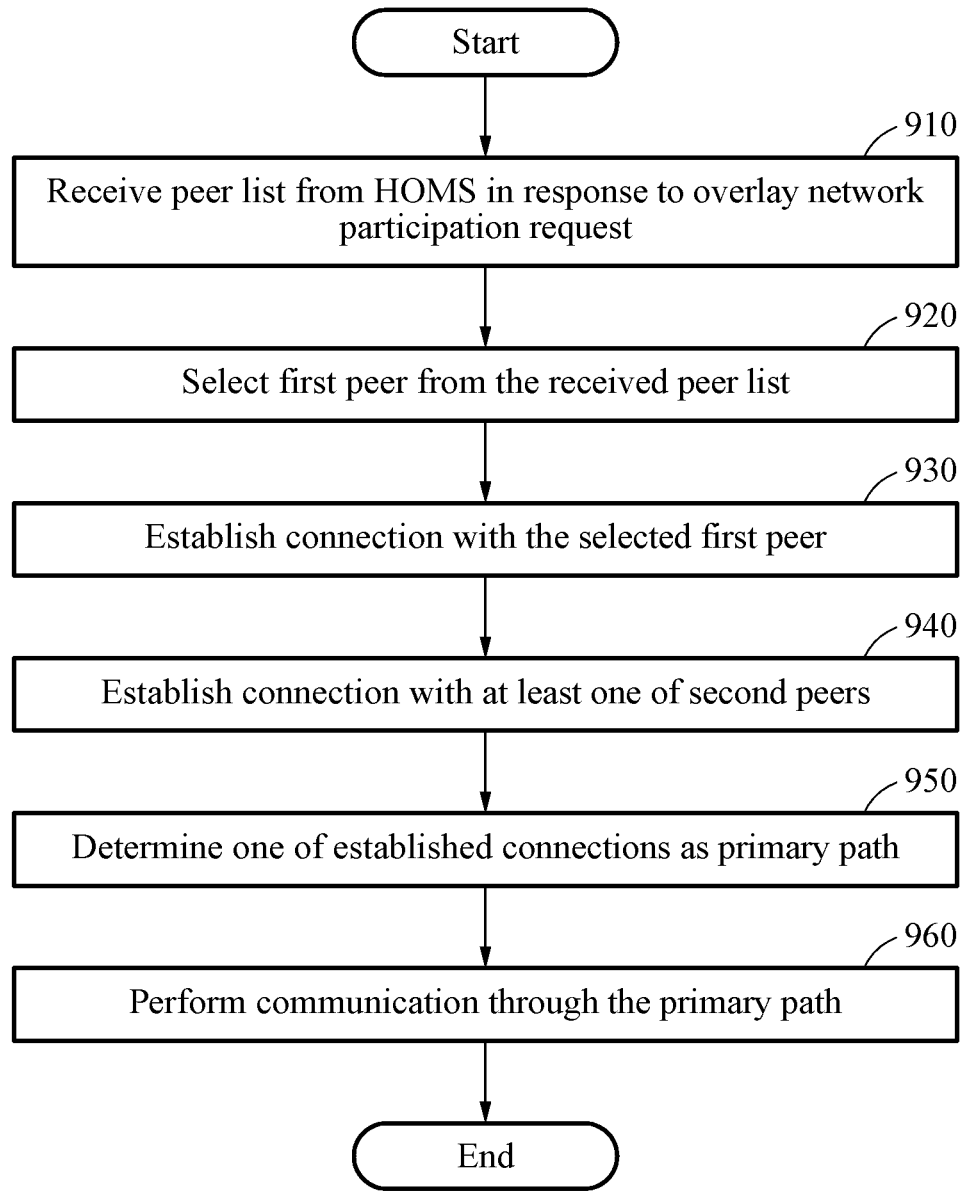
FIG. 9 is a flowchart illustrating an operating method of a peer according to an example embodiment.

FIG. 9 is a flowchart illustrating an operating method of a peer according to an example embodiment.

Referring to FIG. 9, in operation 910, the peer 800 receives a peer list from the HOMS 210 in response to an overlay network participation request.

In operation 920, the peer 800 selects a first peer from the received peer list. In operation 930, the peer 800 establishes a connection with the selected first peer.

In operation 940, the peer 800 establishes a connection with at least one of second peers.

In operation 950, the peer 800 determines one of the established connections as a primary path.

The peer 800 performs a communication through the primary path.

The description of FIGS. 1 through 8 is also application to the description of FIG. 9, and thus further description thereof is not repeated here.

FIGS. 10A through 10H illustrate a HOMP according to an example embodiment.

A HOMP according to an example embodiment may mainly aim to provide characteristic information of a specific overlay network and a list of peers that participate in the overlay network. The HOMP may use a hypertext transfer protocol (HTTP) REST scheme and include content in a JavaScript Object Notation (JSON) format in HTTP body. The HOMP may include a plurality of primitives. The plurality of primitives may include HybridOverlayCreation that will be described with reference to FIG. 10A, HybridOverlayNetworkQuery that will be described with reference to FIG. 10B, HybridOverlayModification that will be described with reference to FIG. 10C, HybridOverlayRemoval that will be described with reference to FIG. 10D, HybridOverlayJoin that will be described with reference to FIG. 10E, HybridOverlayReport that will be described with reference to FIG. 10F, HybridOverlayRefresh that will be described with reference to FIG. 10G, and HybridOverlayLeave that will be described with reference to FIG. 10H.

Figure 10A:
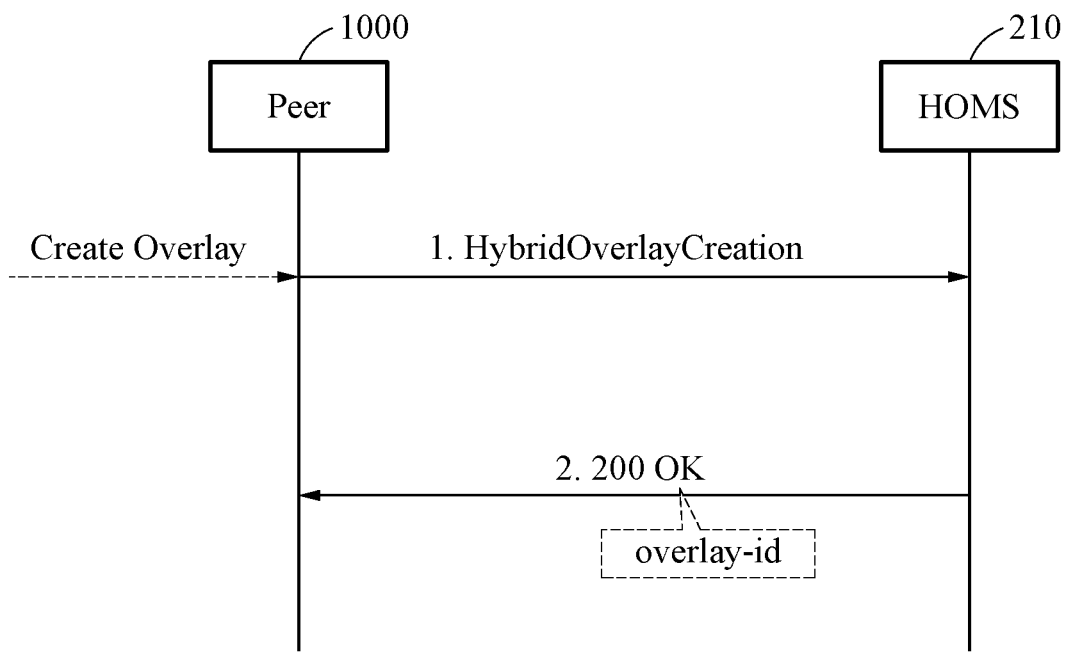
FIGS. 10A through 10H illustrate a hybrid overlay management protocol according to an example embodiment.

Referring to FIG. 10A, a peer 1000 may generate a HybridOverlayCreation message to request creation of a hybrid overlay network, and may transmit the HybridOverlayCreation message to the HOMS 210. The HybridOverlayCreation message may include, but is not limited to, for example, a title and description of content that may be mainly transferred in a hybrid overlay network.

The HOMS 210 may create a hybrid overlay network and overlay information OVERLAY_INFO for the hybrid overlay network. The overlay information OVERLAY_INFO may include, for example, the above-described title and description.

The HOMS 210 may transmit a response to the HybridOverlayCreation message to the peer 1000. The response may include overlay-id.

Figure 10B:
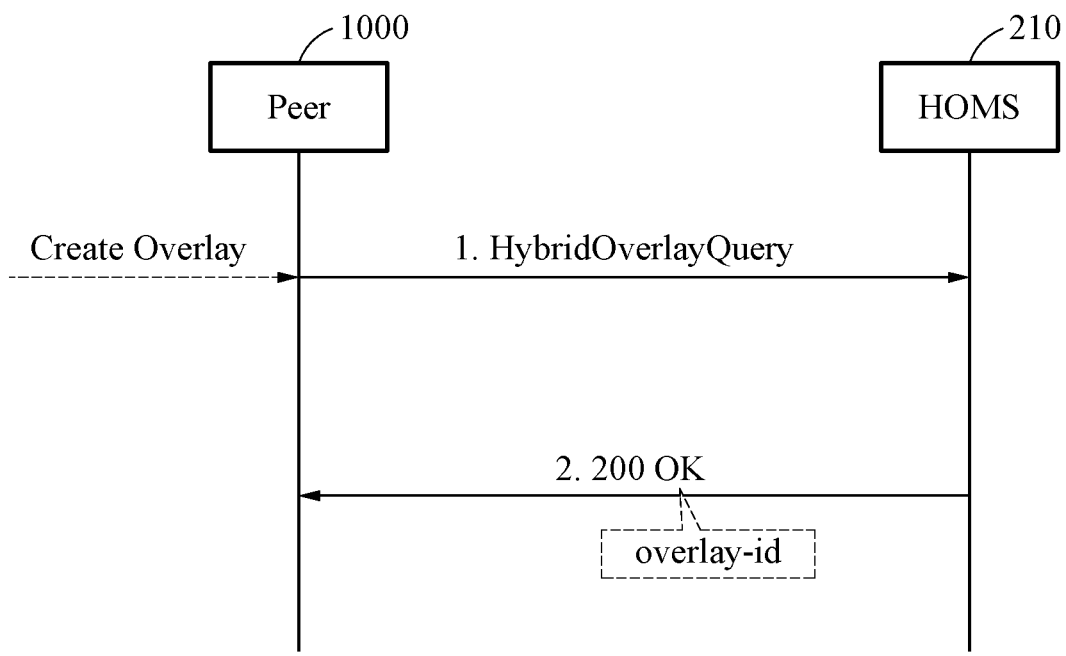

Referring to FIG. 10B, the peer 1000 may generate a HybridOverlayQuery message to fetch information about a hybrid overlay network with the overlay-id, and may transmit the generated HybridOverlayQuery message to the HOMS 210.

The HOMS 210 may search for overlay information OVERLAY_INFO based on the information about the hybrid overlay network with the overlay-id.

The HOMS 210 may transmit a response to the HybridOverlayQuery message to the peer 1000. The response may include, for example, overlay-id, title, or description.

Figure 10C:
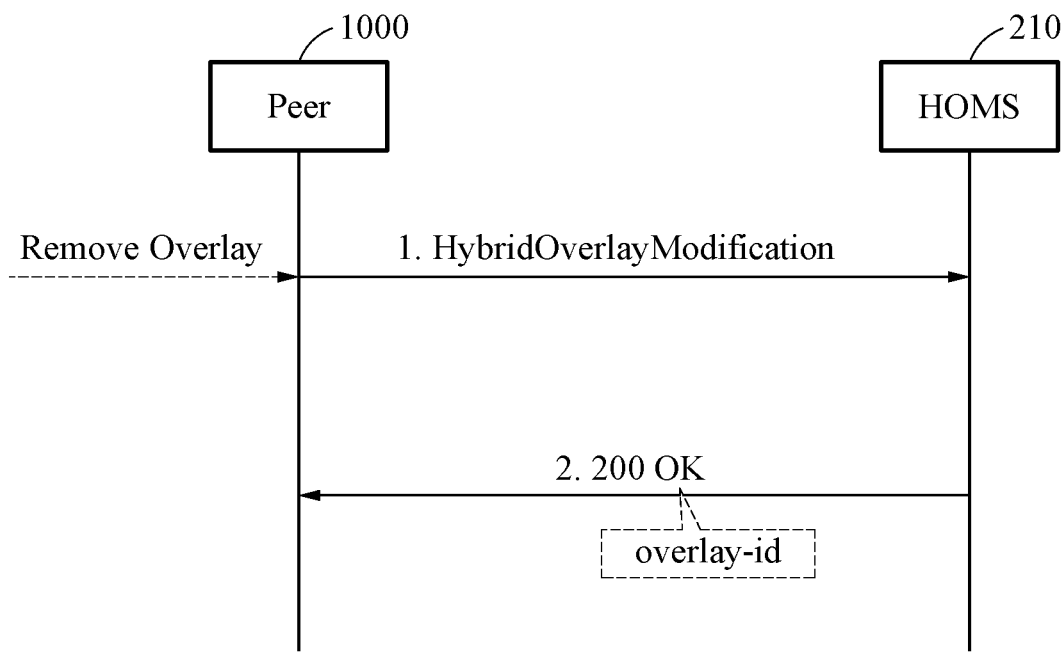

Referring to FIG. 10C, the peer 1000 may generate a HybridOverlayModification message to modify the information about the hybrid overlay network with the overlay-id, and may transmit the generated HybridOverlayModification message to the HOMS 210.

The HOMS 210 may search for overlay information OVERLAY_INFO based on the information about the hybrid overlay network with the overlay-id, and may modify the overlay information. In an example, when the peer 1000 requests the HOMS 210 to modify a title to another title using the HybridOverlayModification message, the HOMS 210 may modify the title to the other title.

The HOMS 210 may transmit a response to the HybridOverlayModification message to the peer 1000.

Figure 10D:
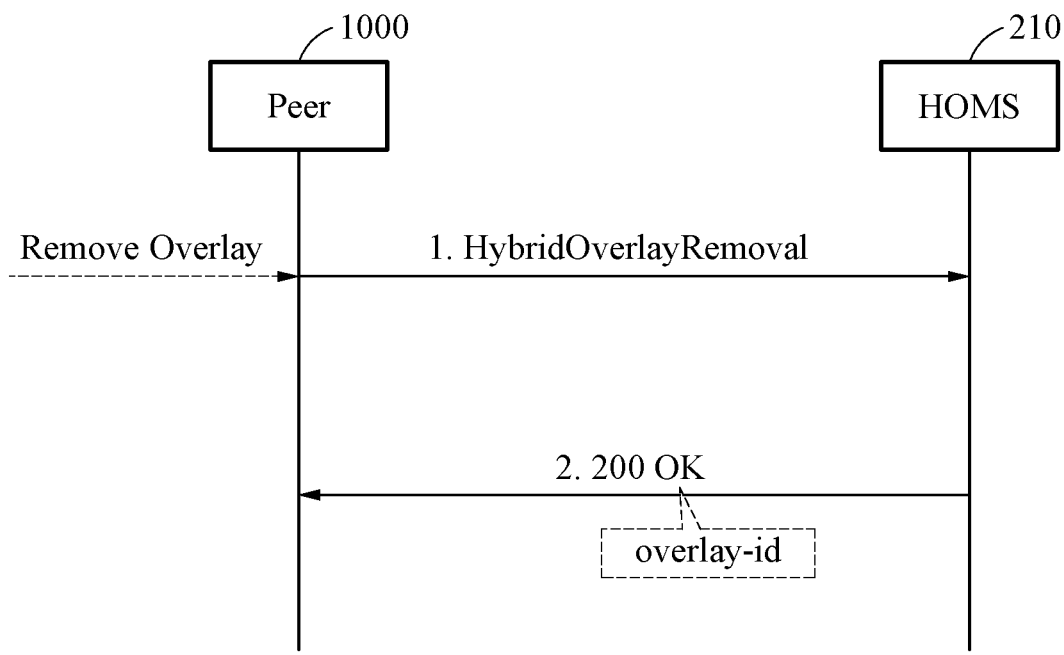

Referring to FIG. 10D, the peer 1000 may generate a HybridOverlayRemoval message to remove the hybrid overlay network with the overlay-id, and may transmit the generated HybridOverlayRemoval message to the HOMS 210.

The HOMS 210 may search for overlay information about the hybrid overlay network, and may delete the hybrid overlay network.

The HOMS 210 may transmit a response to the HybridOverlayRemoval message to the peer 1000. The response may include, for example, overlay-id.

Figure 10E:
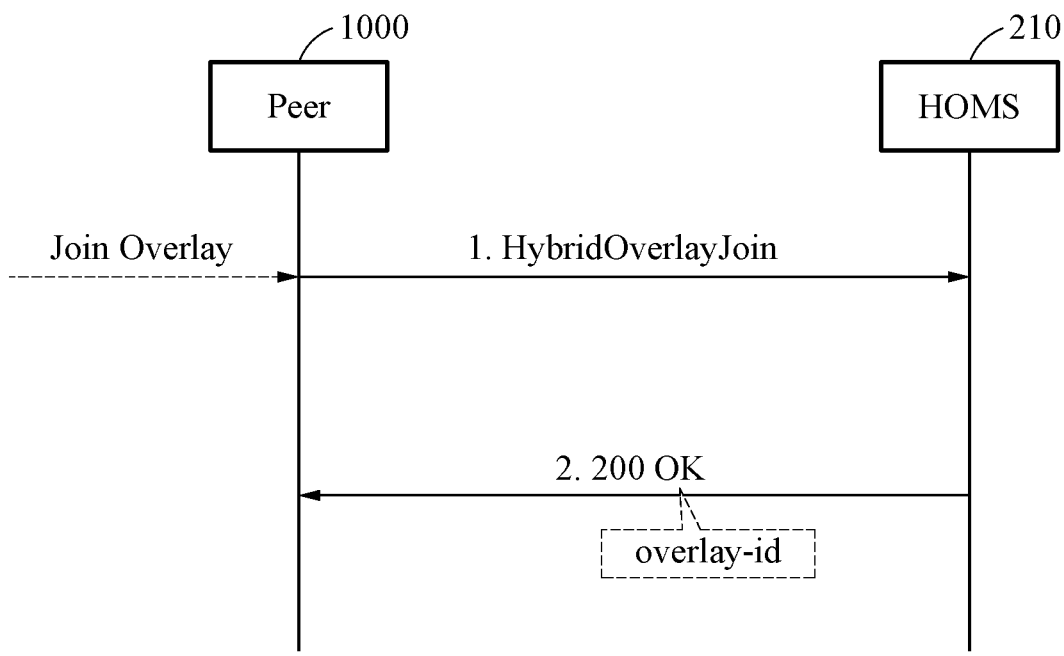

Referring to FIG. 10E, the peer 1000 may generate a HybridOverlayJoin message to join the hybrid overlay network with the overlay-id. The HybridOverlayJoin message may include, for example, overlay-id, a type, a sub-type, and a recovery field of a hybrid overlay network that the peer 1000 wants to join.

The peer 1000 may transmit the generated HybridOverlayJoin message to the HOMS 210.

The HOMS 210 may search for overlay information about the hybrid overlay network with the overlay-id When sub_type is "tree", the HOMS 210 may transmit overlay-id, a type, a sub-type, and peer_info_list of a status as a response to the HybridOverlayJoin message to the peer 1000. The peer_info_list of the status may be an information list for a connection between peers. When the recovery field is "true", the HOMS 210 may provide a list of peers joining earlier than the peer 1000 to the peer 1000. Here, when there is no peer joining earlier than the peer 1000, the HOMS 210 may return null. When null is received, the peer 1000 may not perform an additional operation. When the recovery field is "false" or does not have a value, the HOMS 210 may transmit a list of peers joining the hybrid overlay network to the peer 1000.

When sub_type is "mesh", the HOMS 210 may transmit overlay-id, a type, a sub-type, expires, and peer_info_list of a status as a response to the HybridOverlayJoin message to the peer 1000. Here, the peer_info_list of the status may be an information list for a connection between peers.

Figure 10F:
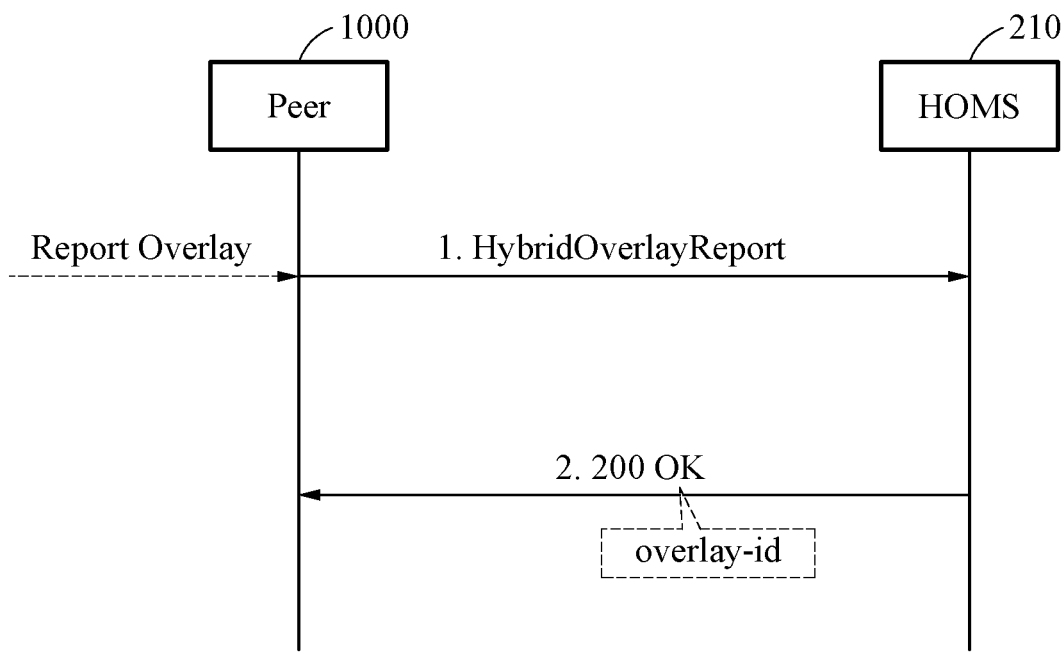

Referring to FIG. 10F, the peer 1000 may generate a HybridOverlayReport message to report its statue to the hybrid overlay network with the overlay-id. For example, when a primary connection or a candidate connection changes, the HybridOverlayReport message may be generated.

The HybridOverlayReport message may include max_capa indicating a maximum number of connections of the peer 1000, or num_primary indicating a number of primary connections.

The peer 1000 may transmit the generated HybridOverlayReport message to the HOMS 210.

The HOMS 210 may store status information of the peer 1000 in a peer list with overlay-id.

The HOMS 210 may transmit overlay-id as a response to the HybridOverlayReport message to the peer 1000.

Figure 10G:
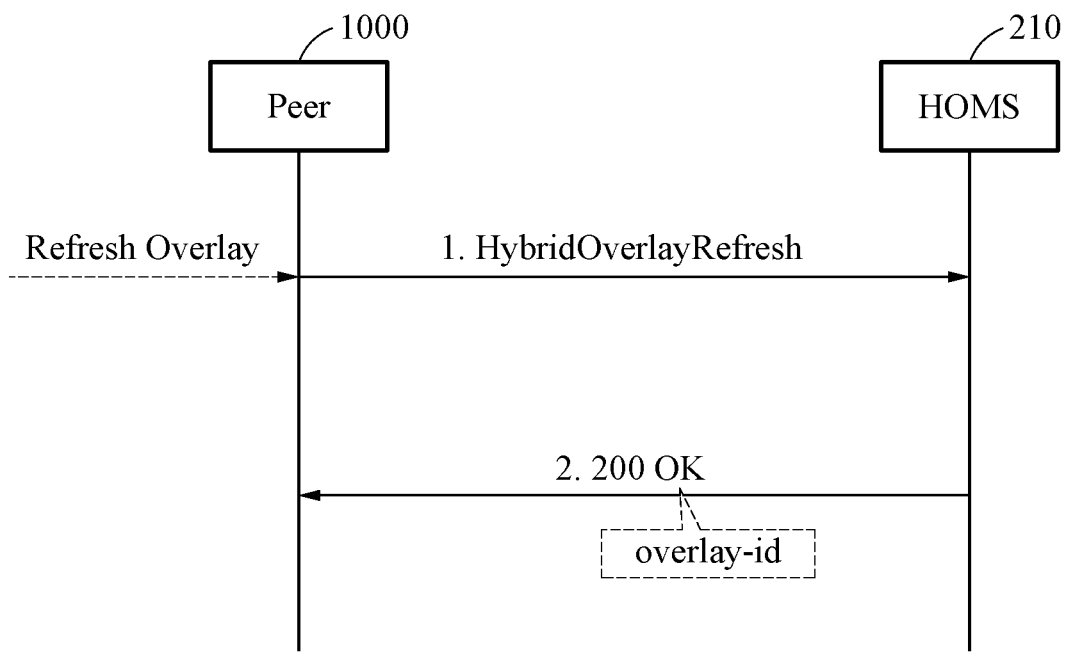

Referring to FIG. 10G, the peer 1000 may generate a HybridOverlayRefresh message to extend a status of joining the hybrid overlay network.

The HybridOverlayRefresh message may include, for example, overlay-id, peer-id, a peer address, public_key, and a password of a hybrid overlay network that the peer 1000 wants to refresh. The peer-id, the peer address, the public_key, and the password may be used to determine whether the peer 1000 is a legitimate peer.

The HOMS 210 may search for information about a hybrid overlay network with requested overlay-id.

The HOMS 210 may determine whether peer information included in the HybridOverlayJoin message is correct.

When the peer information is determined to be correct, the HOMS 210 may transmit a response to the HybridOverlayRefresh message to the peer 1000. The response may include, for example, overlay-id.

Figure 10H:
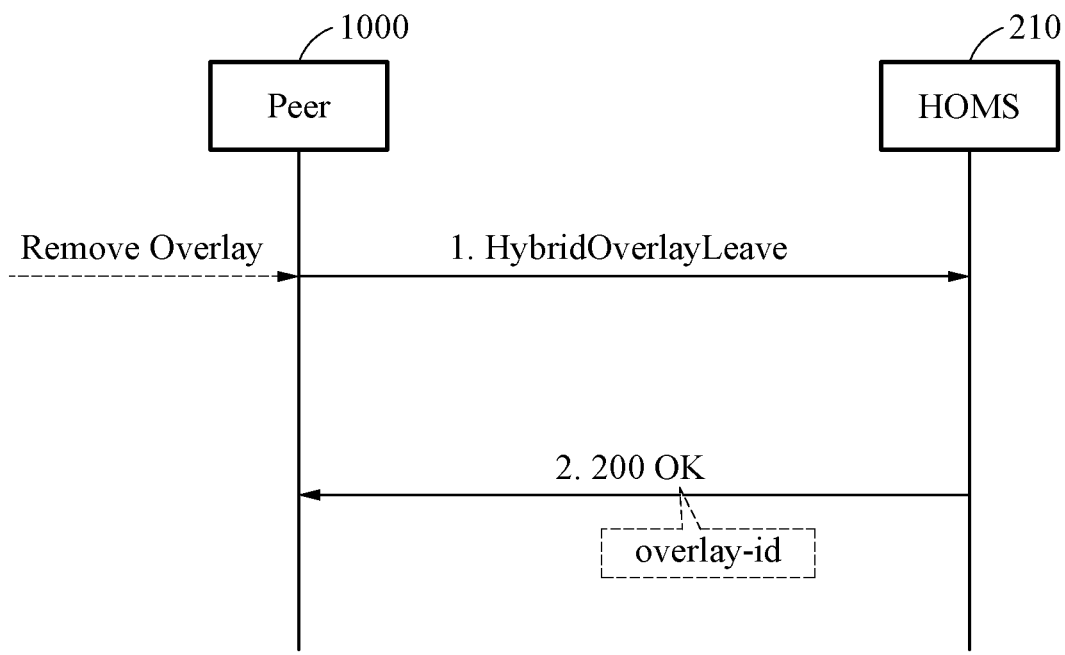

Referring to FIG. 10H, the peer 1000 may generate a HybridOverlayLeave message to leave the hybrid overlay network.

The HybridOverlayLeave message may include, for example, overlay-id, a type, a sub-type, and peer information of a hybrid overlay network that the peer 1000 wants to leave. The peer information may include, for example, peer_id, public_key, and a password. The peer information may be used to determine whether the peer 1000 is a legitimate peer.

The peer 1000 may transmit the generated HybridOverlayLeave message to the HOMS 210.

The HOMS 210 may search for information about the hybrid overlay network with the overlay-id.

The HOMS 210 may determine whether the peer 1000 is participating in the hybrid overlay network with the overlay-id, based on the type, the sub-type, and the peer information included in the HybridOverlayLeave message. When the peer 1000 is participating in the hybrid overlay network, the HOMS 210 may allow the peer 1000 to leave the hybrid overlay network.

The HOMS 210 may transmit a response to the HybridOverlayLeave message to the peer 1000. The response may include, for example, overlay-id.

FIGS. 11A through 11I illustrate a hybrid overlay peer protocol according to an example embodiment.

A hybrid overlay peer protocol according to an example embodiment may be a message used between peers, and may perform a function of constructing, maintaining and recovering a tree, or transmitting data.

Figure 11A:
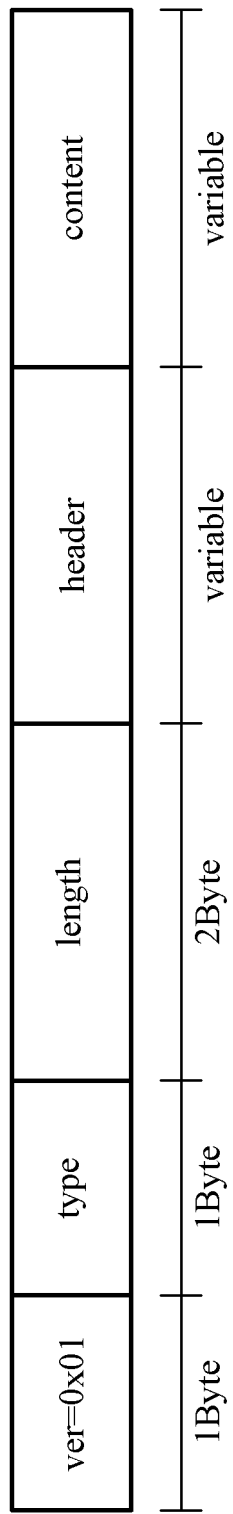
FIGS. 11A through 11I illustrate a hybrid overlay peer protocol according to an example embodiment.

FIG. 11A illustrates an example of a message format in the hybrid overlay peer protocol.

Referring to FIG. 11A, the message format in the hybrid overlay peer protocol may include a version, a type, a length, a header, and content.

The version may indicate a protocol message version. For example, a current version may be set to 0x01.

The type may indicate a type of a message included in the header, and may be set to 0x01.

The length may indicate a length of the header.

The content may include content data corresponding to a length of a payload field included in the header.

For example, a peer may be used to maintain configuration information for an operation, and used as a parameter for an operation of a protocol. Examples of configuration information are shown in Table 4 below.

TABLE 4

| | |
|---|---|
| PEER_ESTAB_MAX_COUNT | Maximum number of connections between a peer and other peers through ESTAB_PEER messages from the other peers after the peer sends a HELLO message |
| PEER_ESTAB_TIMEOUT | Waiting time until a number of connections reaches PEER_ESTAB_MAX_COUNT after a peer sends a HELLO message. If the waiting time is exceeded, a related operation is interrupted and PROBE_PEER is performed even though the number of connections does not reach the maximum number of connections. |
| MAX_PRIMARY_CONNECTION | Maximum number of primary connections |
| MAX_INCOMING_CANDIDATE | Maximum number of incoming candidate connections |
| MAX_OUTGOING_CANDIDATE | Maximum number of outgoing candidate connections |
| HELLO_PEER_TTL | TTL value to be included in a HELLO_PEER message |
| ESTAB_PEER_TIMEOUT | Time in which a peer waits to receive ESTAB_PEER messages from other peers. For an ESTAB_PEER message received after the time, the peer sends a rejection response and terminates a connection. |
| ESTAB_PEER_MAX_COUNT | If a number of ESTAB_PEER messages received by a peer from other peers exceeds this value, the peer performs a subsequent process, sends a rejection response to an ESTAB_PEER message received later, and terminates a connection. |

Messages that will be described with reference to FIGS. 11B through 11I may have the format of FIG. 11A. Hereinafter, messages in the hybrid overlay peer protocol will be described with reference to FIGS. 11B through 11I.

Figure 11B:
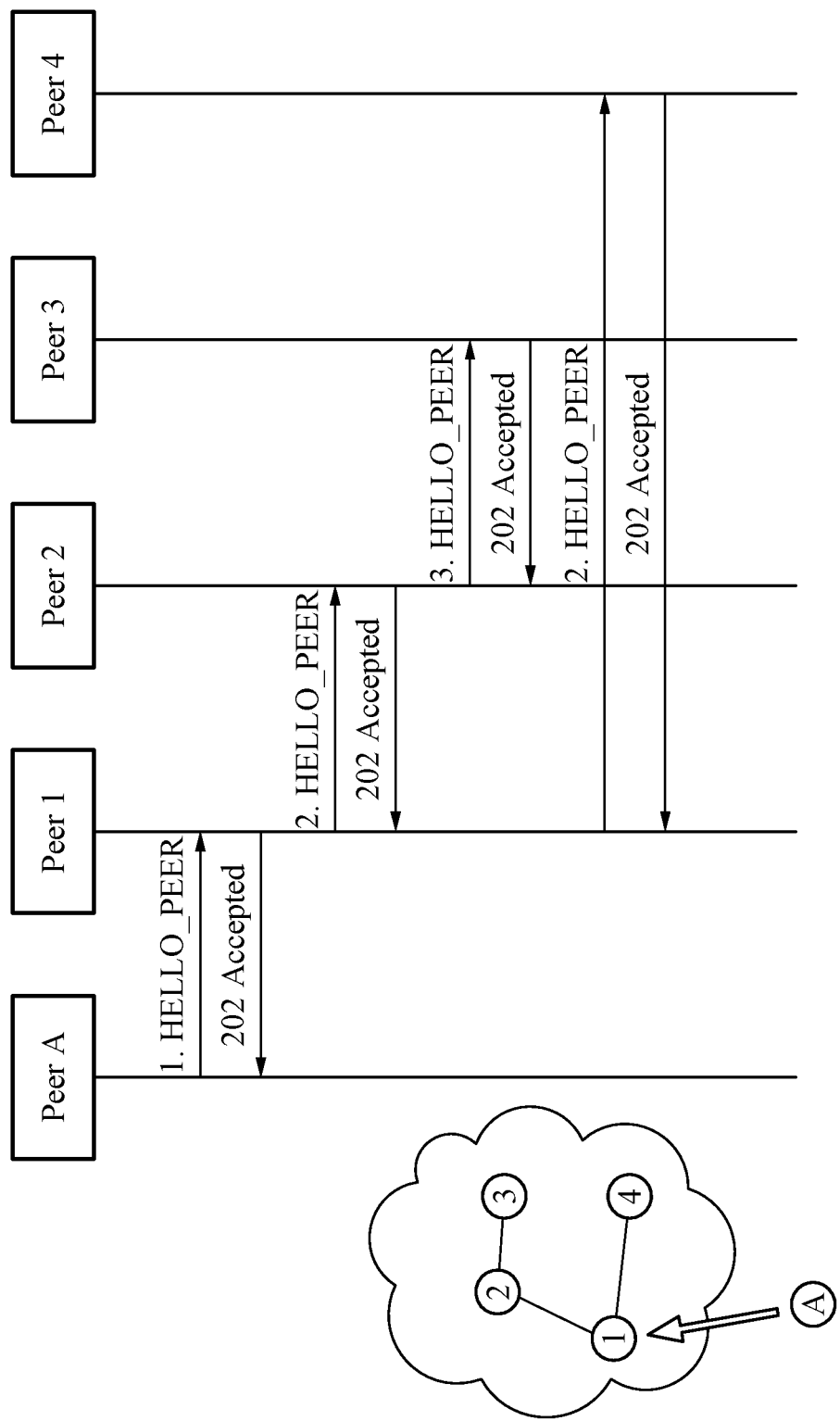

FIG. 11B illustrates a HELLO_PEER message.

The HELLO_PEER message may be a message used by a new peer to participate in or join an overlay network.

Referring to FIG. 11B, to newly participate in a hybrid overlay network, a peer A may select a peer 1 from a peer list received from the HOMS 210.

The peer A may transmit a HELLO_PEER message to the peer 1. Here, the HELLO_PEER message may include, for example, overlay_id, conn_num, and information (for example, peer_id, or an address) of the peer A.

The peer 1 may transmit a HELLO_PEER message again to each of peers 2 and 4 connected via primary paths.

Figure 11C:
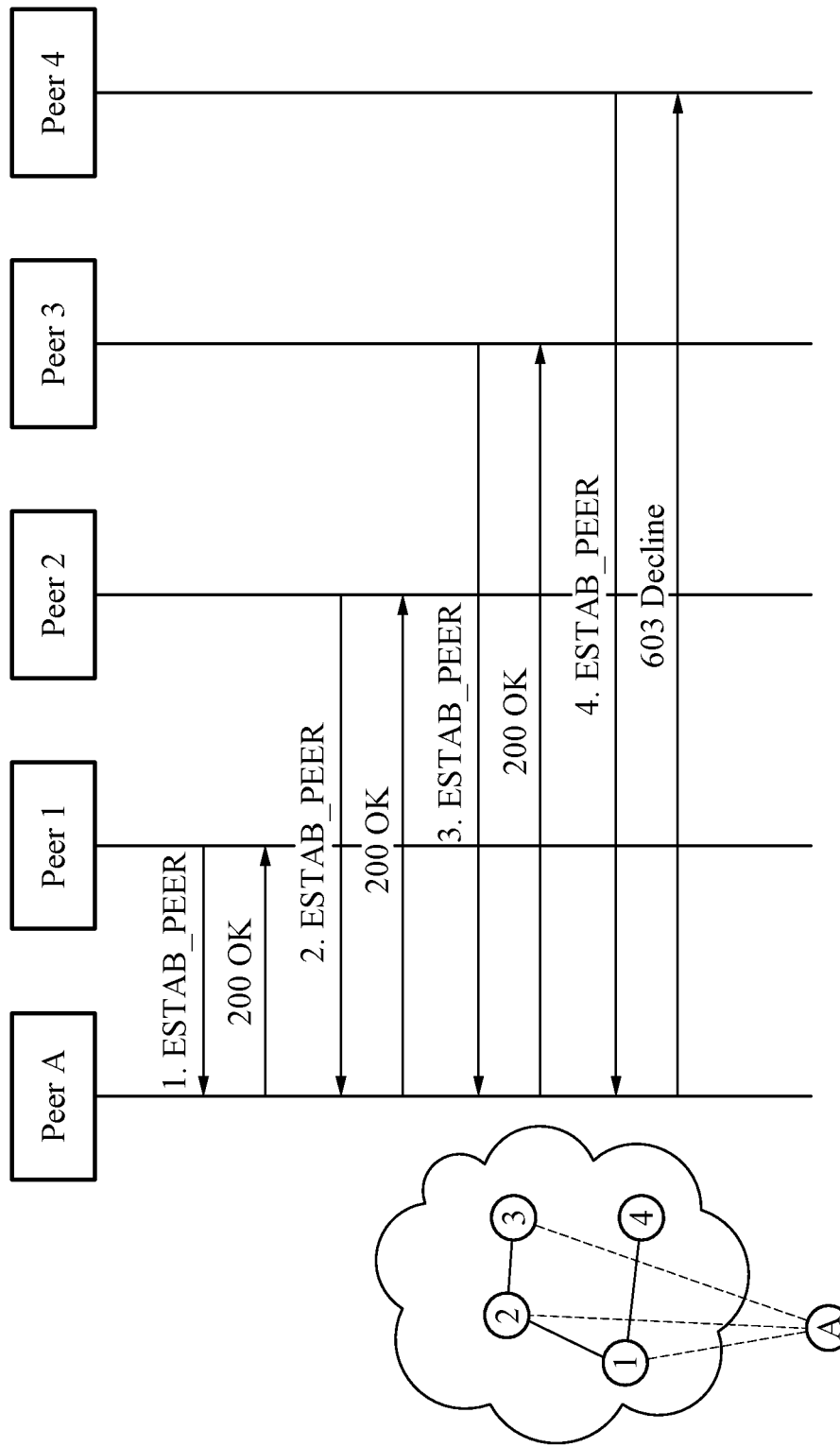

FIG. 11C illustrates an ESTAB_PEER message.

The ESTAB_PEER message may be a message used to connect to a peer that transmits a HELLO_PEER message when it is determined that a peer receiving the HELLO_PEER message has available resources.

Referring to FIG. 11C, each of peers 1, 2, 3, and 4 may generate an ESTAB_PEER message and may transmit the ESTAB_PEER message to a peer A. The ESTAB_PEER message may include, for example, overlay-id, and peer_id of a peer that transmits the ESTAB_PEER message.

Although the peer A receives the ESTAB_PEER message from the peer 4, the peer A may determine that no further connection is needed due to sufficient connections of the peer A. Here, the peer A may generate a decline response and transmit the decline response to the peer 4.

Figure 11D:
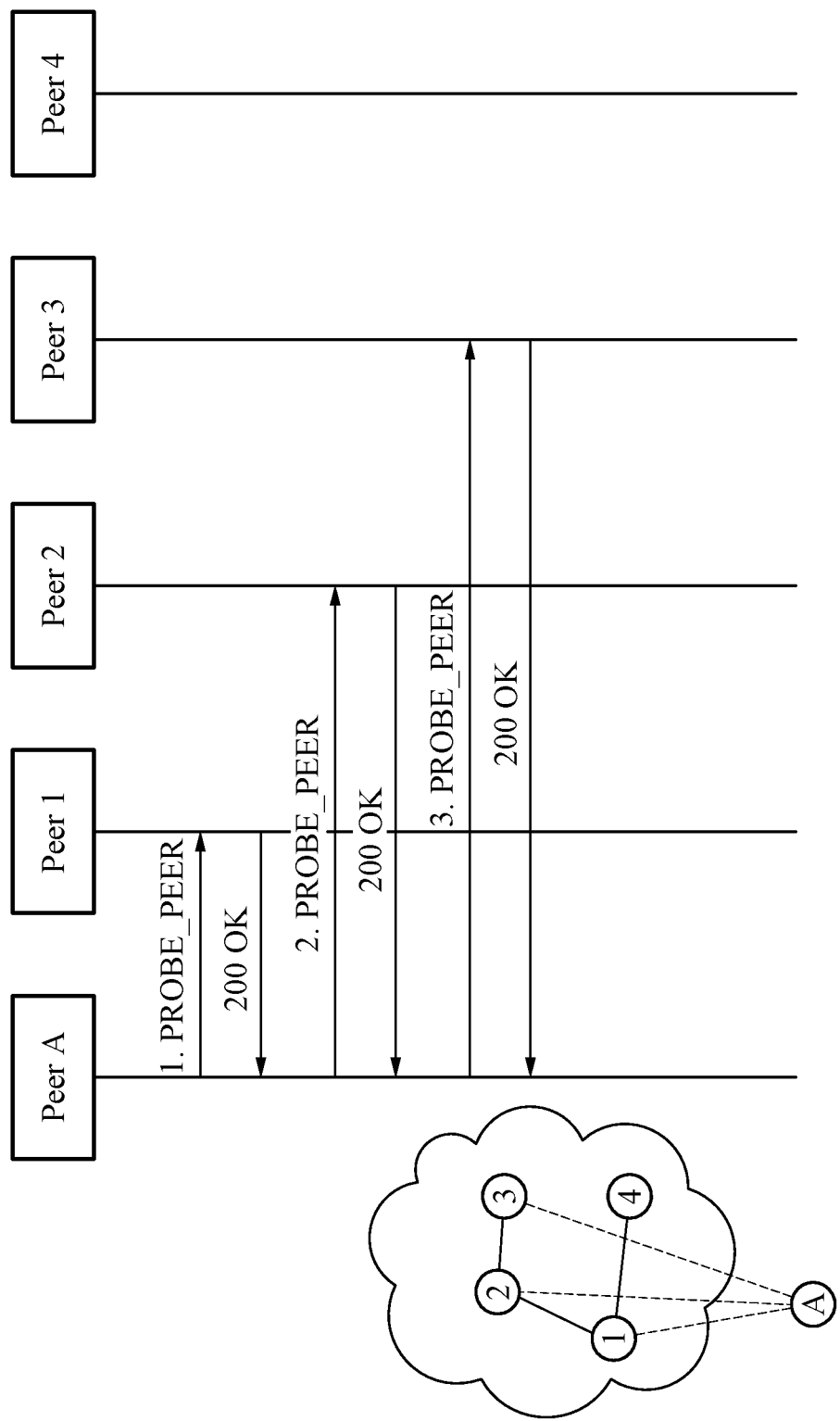

FIG. 11D illustrates a PROBE_PEER message.

The PROBE_PEER message may be a message sent to check a network distance with a peer that transmits an ESTAB_PEER message when it is determined that sufficient connections are secured when a peer receives ESTAB_PEER messages from a plurality of peers.

Referring to FIG. 11D, a peer A may transmit a PROBE_PEER message to each of peers 1, 2 and 3. The PROBE_PEER message may include, for example, ntp-time. The ntp-time may indicate an NTP timestamp, or a local time of a system.

Each of the peers 1, 2 and 3 may include the ntp-time of the PROBE_PEER message in a response, and may transmit the response to the peer A.

When a response is received from each of the peers 1, 2 and 3, the peer A may calculate a network cost (or a network distance between the peer A and each of the peers 1, 2 and 3) for each of the peers 1, 2 and 3.

Figure 11E:
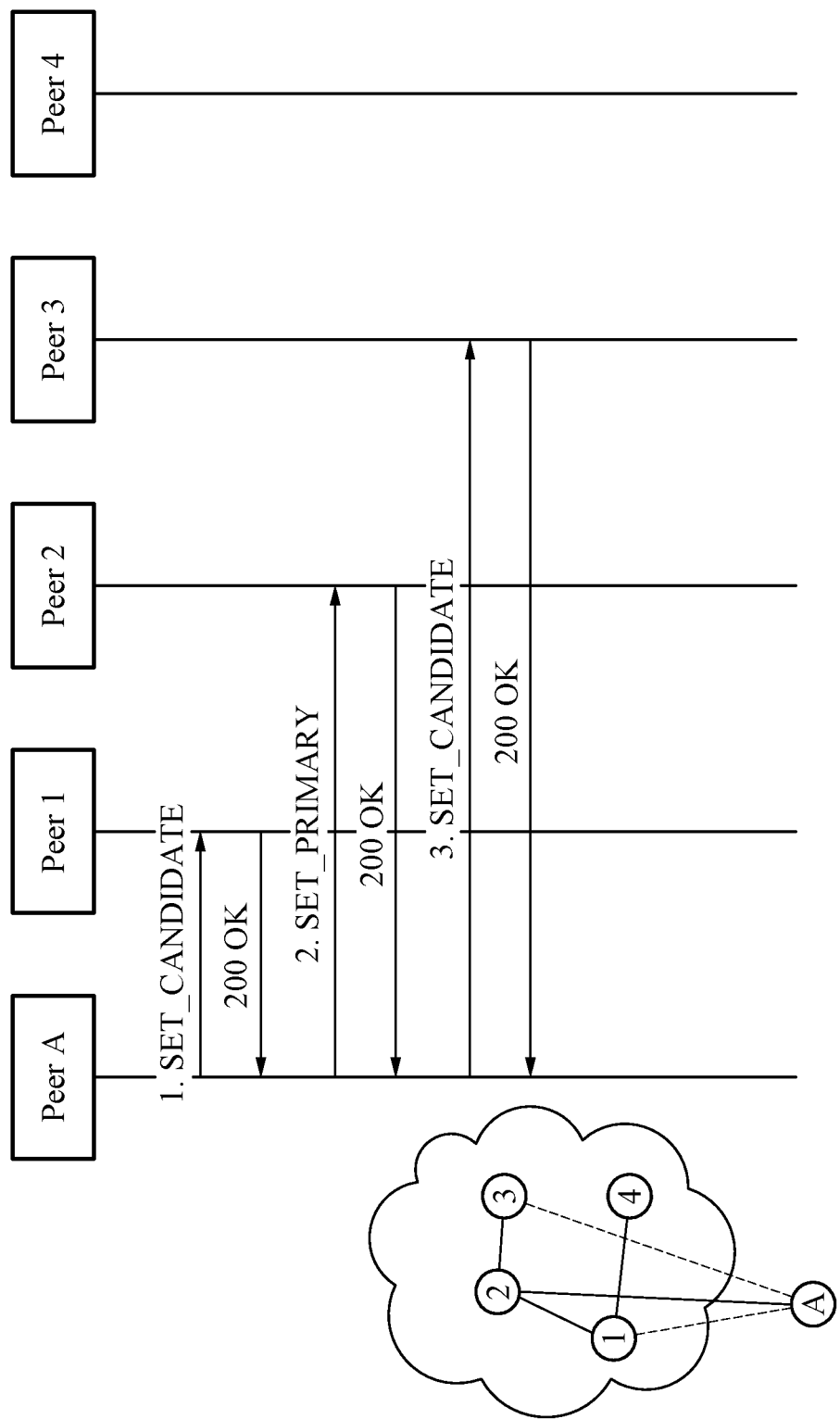

FIG. 11E illustrates a SET_PRIMARY message and a SET_CANDIDATE message.

When a network distance for all connections is checked through a PROBE_PEER process, a SET_PRIMARY message may be transmitted to a peer with an excellent performance. SET_CANDIDATE messages may be transmitted to the other peers.

Referring to FIG. 11E, a peer A may select a peer 2 from among peers 1, 2 and 3, and may transmit a SET_PRIMARY message to the peer 2 to designate the peer 2 as a primary connection. The peer A may transmit a SET_CANDIDATE message to each of the peers 1 and 3 to designate each of the peers 1 and 3 as a candidate connection. Here, the peer A may regard each of the peers 1 and 3 as an outgoing candidate, and each of the peers 1 and 3 may regard the peer A as an incoming candidate.

Figure 11F:
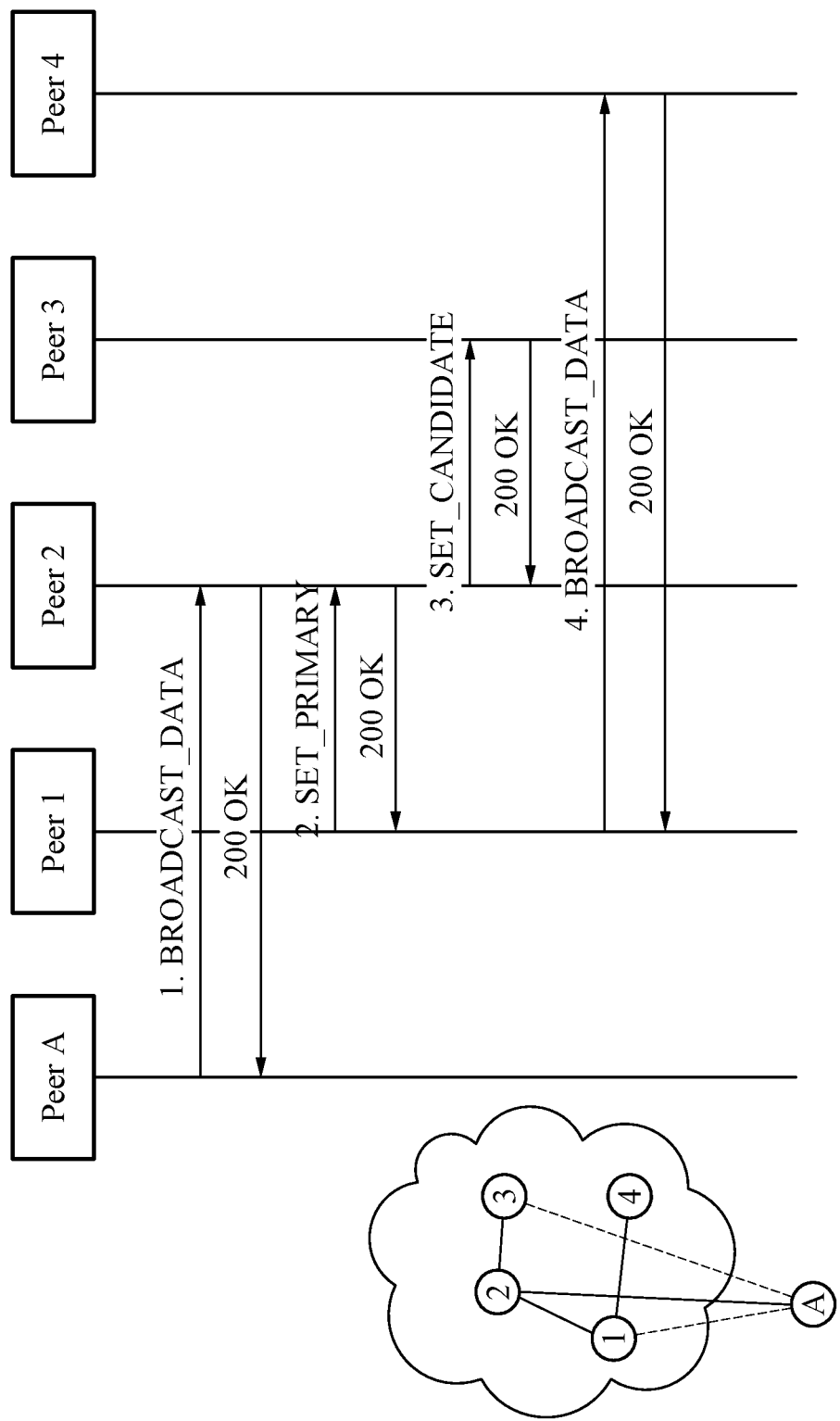

FIG. 11F illustrates a BROADCAST_DATA message.

The BROADCAST_DATA message may be a message used to broadcast data over an overlay network. A payload of the BROADCAST_DATA message may include binary and text. A peer receiving the BROADCAST_DATA message may transmit the BROADCAST_DATA message to each of other primary peers of the peer.

Referring to FIG. 11F, a peer A may transmit a BROADCAST_DATA message to a peer 2. The BROADCAST_DATA message may be transferred to a leaf node of a tree.

The BROADCAST_DATA message may include peer-id. The peer-id may indicate an ID of a peer, for example, the peer A, that initially generates the BROADCAST_DATA message. Thus, each of peers 1, 2, 3, and 4 that receive the BROADCAST_DATA message in FIG. 11F may recognize that the BROADCAST_DATA message is generated by the peer A.

Figure 11G:
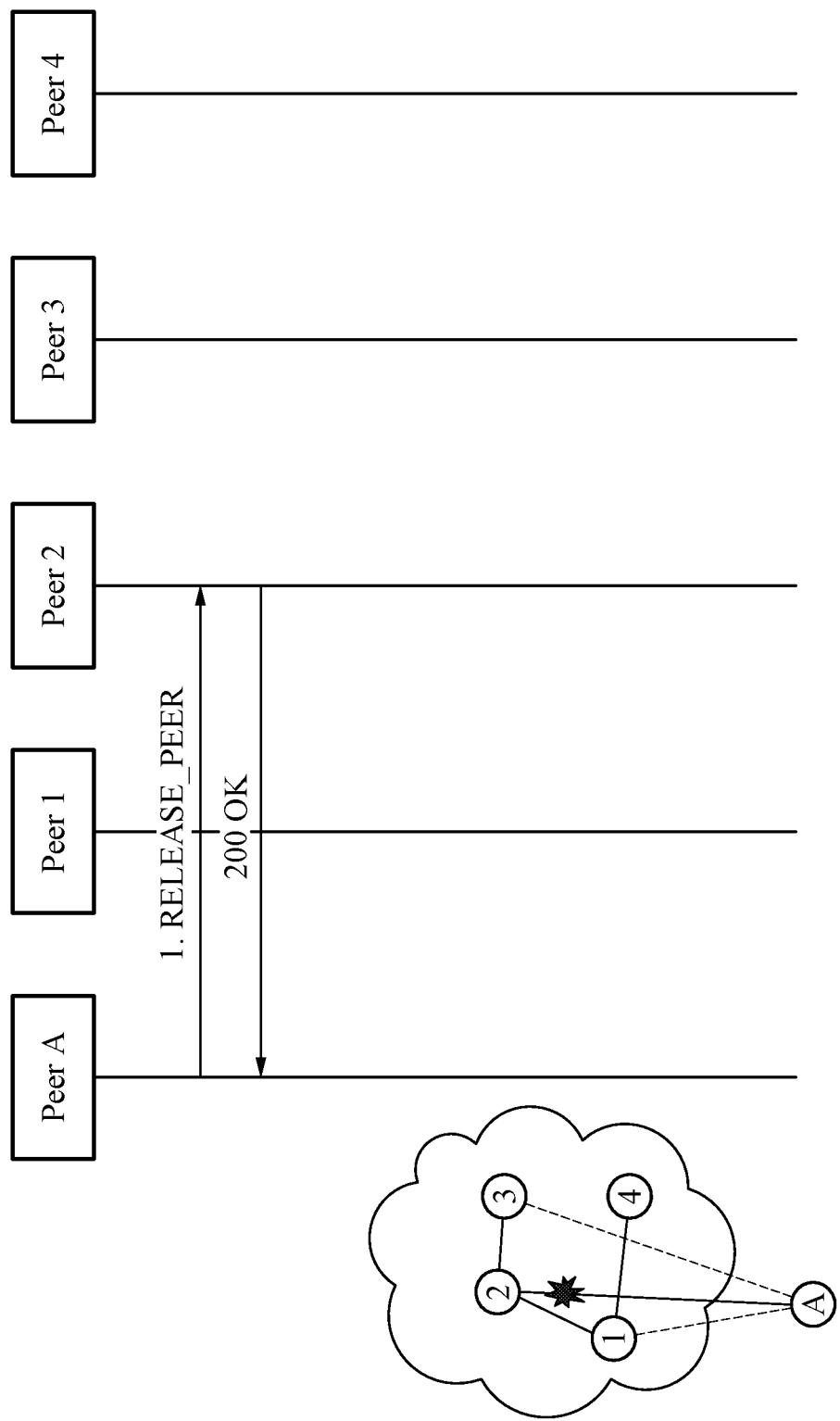

FIG. 11G illustrates a RELEASE_PEER message.

The RELEASE_PEER message may be used by a peer to explicitly terminate a connection with another peer.

Referring to FIG. 11G, a peer A may transmit a RELEASE_PEER message to a peer 2 to release a connection with the peer 2.

The peer A may sign the RELEASE_PEER message with a private key and may include a signature of the peer A in the RELEASE_PEER message. Thus, it is possible to prevent a third party from disconnecting the peer A from the peer 2.

In an example, when an ack parameter in the RELEASE_PEER message is true, the peer 2 may transmit a response to the peer A. In this example, the peer A transmitting the RELEASE_PEER message may terminate the connection.

In another example, when the ack parameter is not included in the RELEASE_PEER message or is false, the peer 2 may not transmit a response to the peer A. In this example, the peer 2 receiving the RELEASE_PEER message may terminate the connection.

Figure 11H:
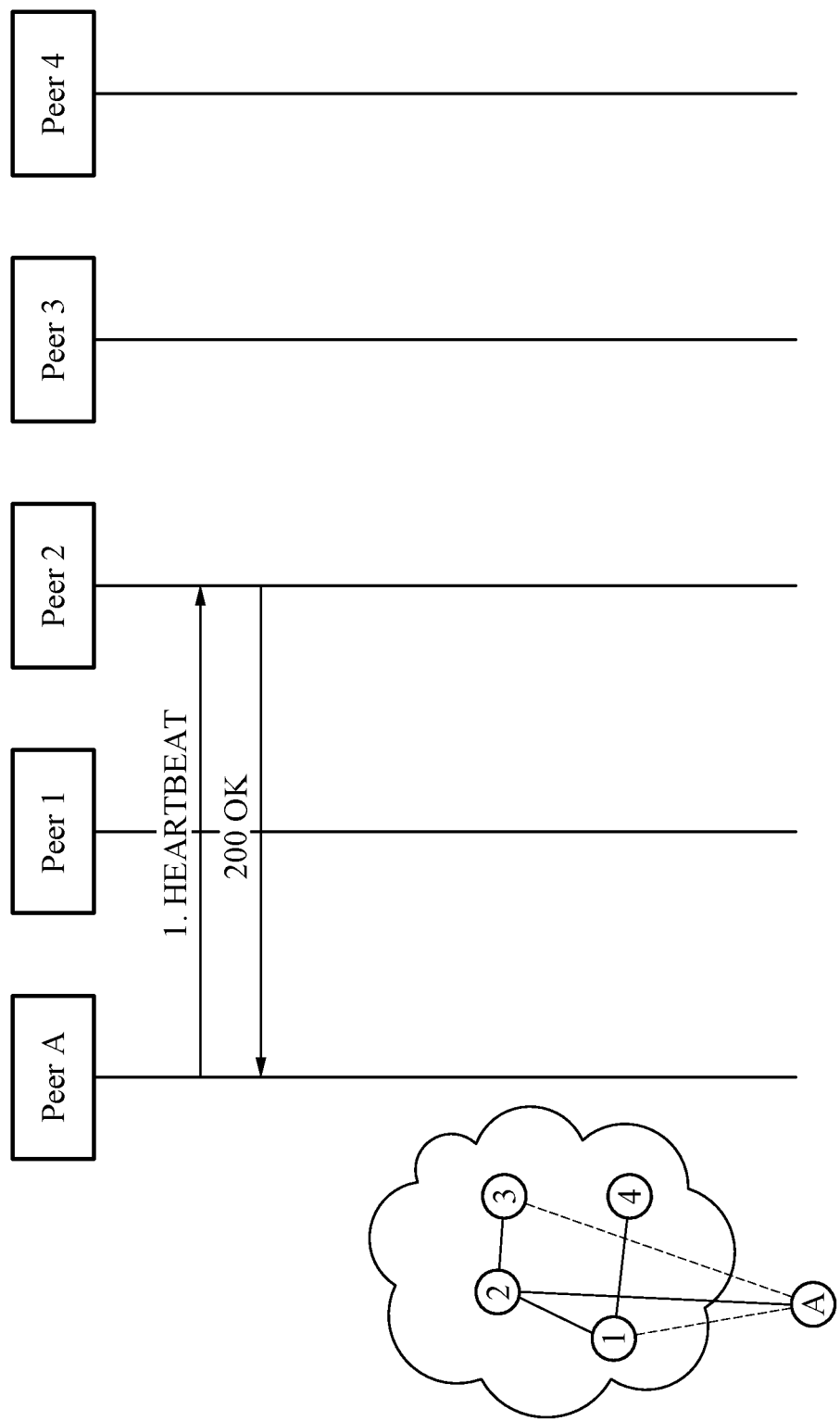

FIG. 11H illustrates a HEARTBEAT message.

The HEARTBEAT message may be a message used to verify statuses of peers. The HEARTBEAT message may be periodically transmitted and received.

When a connection between peers is a primary connection, a peer with a low ticket ID among the peers may transmit a HEARTBEAT message. When the connection between the peers is a candidate connection, a peer corresponding to an outgoing candidate may transmit a HEARTBEAT message.

Based on a value of a parameter (for example, heartbeat-interval, and heartbeat-timeout) received when a peer joins an overlay network, a transmission period of the HEARTBEAT message, and whether a timeout occurs may be determined.

Referring to FIG. 11H, a peer A may transmit a HEARTBEAT message to a peer 2 to inform that a connection is maintained. In FIG. 11H, the peer 2 may receive the HEARTBEAT message from the peer A every heartbeat-interval. When the peer 2 fails to receive the HEARTBEAT message from the peer A within a HEARTBEAT timeout, a connection with the peer A may be regarded to be released. The HEARTBEAT timeout may be 1.5 times greater than a value of the heartbeat-interval.

The peer 2 may update its information and may transmit a response to the peer A.

Figure 11I:
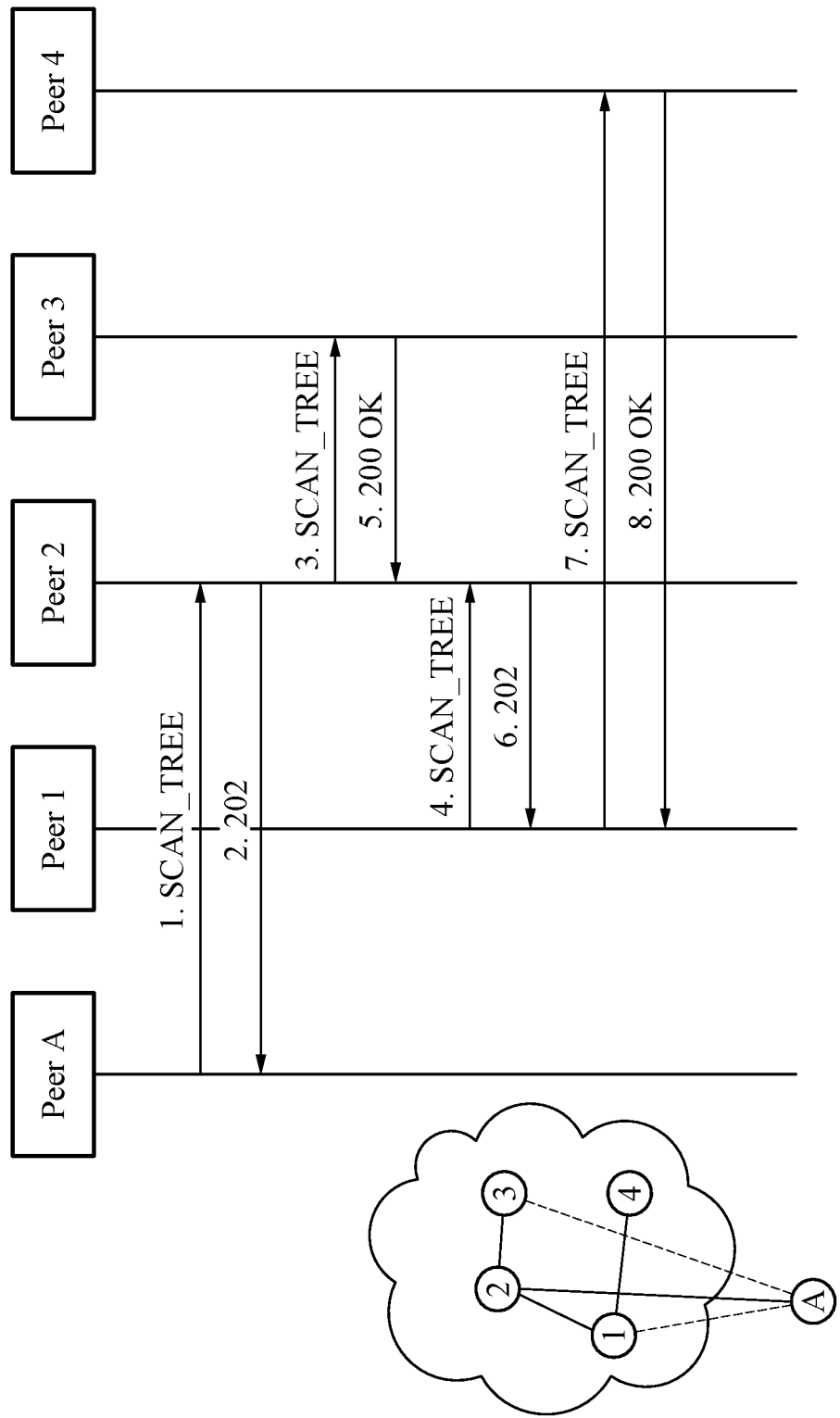

FIG. 11I illustrates a SCAN_TREE message.

The SCAN_TREE message may be a message to verify a structure of an overlay network. A peer that receives a SCAN_TREE message may describe its address information in a via field of the SCAN_TREE message, and may transmit the SCAN_TREE message to other primary peers. In an example, when there is a sub-primary peer, a primary peer that receives the SCAN_TREE message may transmit a response. In another example, when there is no sub-primary peer (leaf node), the primary peer may transmit a 200 response. In both the examples, a peer that generates a response may write its address in a top of a path field of the response, and may transmit the response to a top address of a Via field of the response. A peer that receives the response may determine whether the top address recorded in the Via field of the response is its own address. When the top address is determined to be the address of the peer, the peer may subtract the address of the peer from the Via field, may move the address to the top of the Path field, and may transmit a response to a top peer of the Via field.

Referring to FIG. 11I, a peer A may transmit a SCAN_TREE message to a peer 2 that is in a primary connection with the peer A. The SCAN_TREE message may include, for example, a via field having peer-id and an address of the peer A.

Figure 12A:
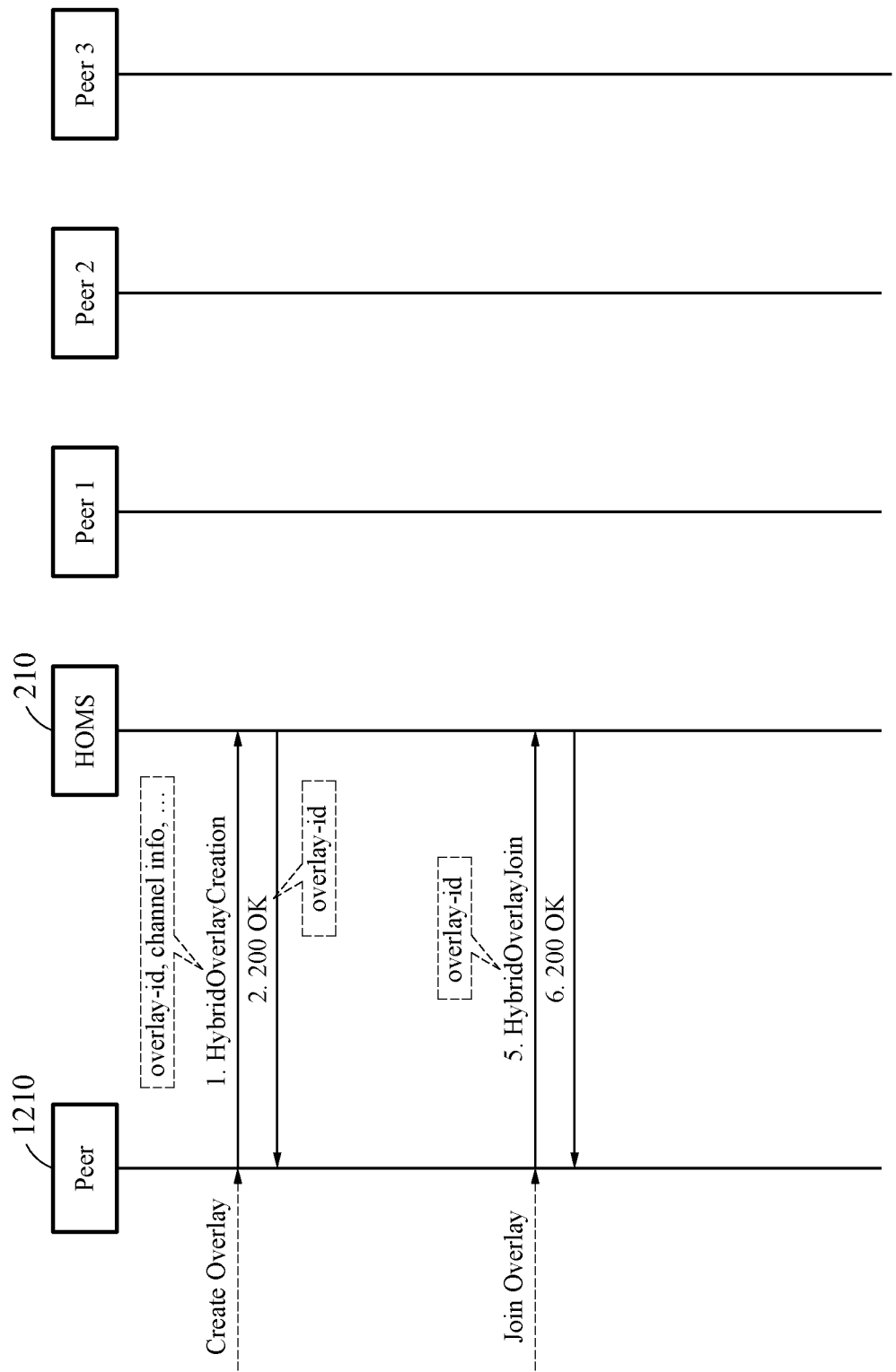
FIG. 12A illustrates a data streaming service creation according to an example embodiment.

FIG. 12A illustrates a data streaming service creation according to an example embodiment.

Referring to FIG. 12A, a peer 1210 may transmit a HybridOverlayCreation message to the HOMS 210, and may receive a response from the HOMS 210.

The peer 1210 may transmit a HybridOverlayJoin message to the HOMS 210, and may receive a response from the HOMS 210. Thus, a data streaming service may be created.

Figure 12B:
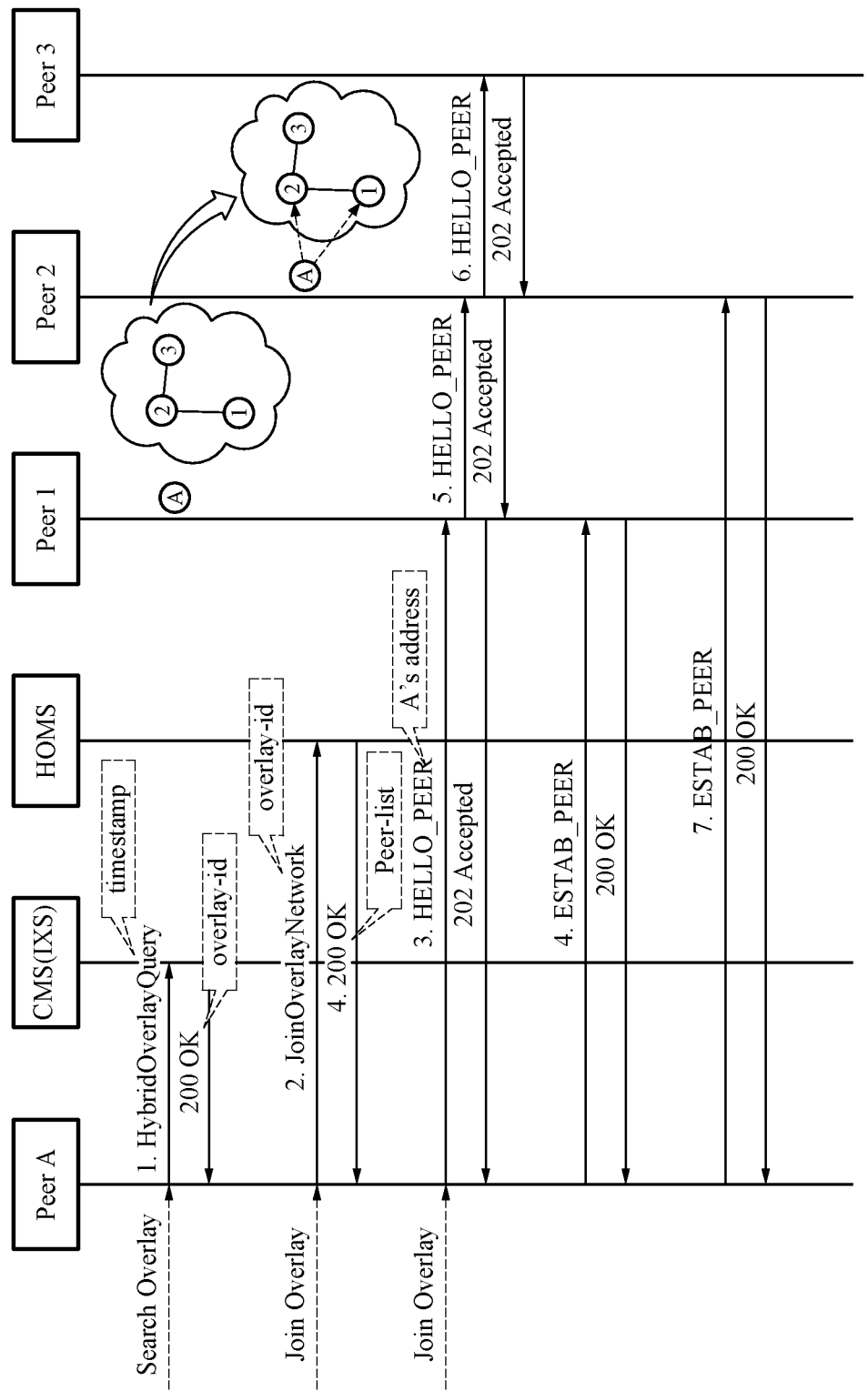
FIGS. 12B and 12C illustrate a data streaming service join according to an example embodiment.
Figure 12C:
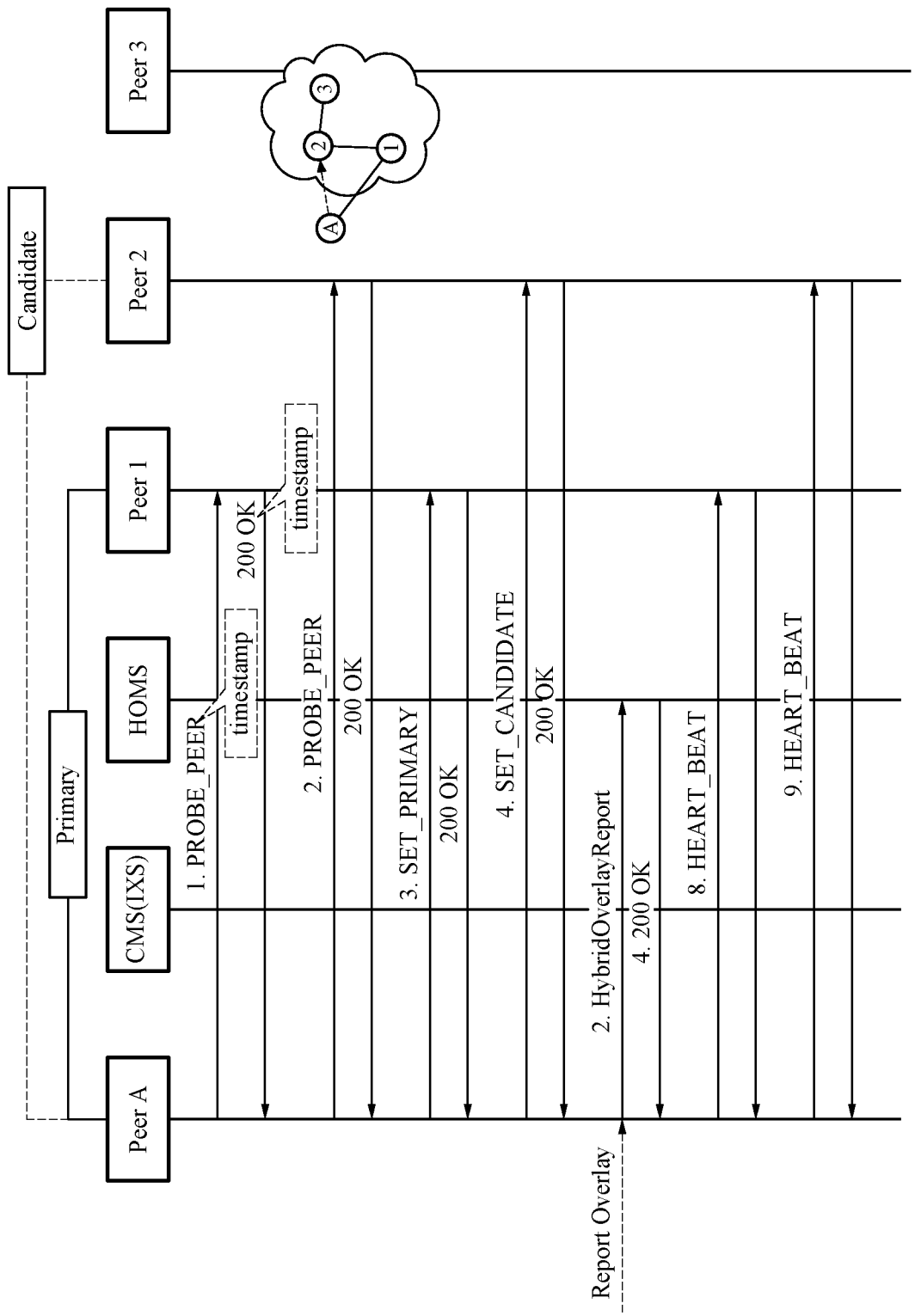

FIGS. 12B and 12C illustrate a data streaming service join according to an example embodiment.

In examples of FIGS. 12B and 12C, a peer A may correspond to a peer that wants to newly join an overlay network.

The peer A may receive a peer list from the HOMS 210.

After sending a HELLO_PEER message, the peer A may receive ESTAB_PEER messages from other peers until a value of ESTAB_PEER_MAX_COUNT is reached.

For example, when a MAX value fails to be reached until ESTAB_PEER_TIMEOUT passes, the peer A may construct a tree with currently connected peers. The peer A may decline an ESTAB_PEER request arriving after ESTAB_PEER_TIMEOUT.

The peer A may calculate a network distance with respect to established connections using a PROBE_PEER message.

The peer A may transmit a SET_PRIMARY message to a peer 1. Here, the peer A may transmit a SET_CANDIDATE message to a peer 2.

The peer A may report primary connection information and candidate connection information to the HOMS 210.

The peer A may periodically transmit HEARTBEAT messages to the peers 1 and 2 and may determine whether connections are maintained.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An operating method of a peer, comprising:
receiving a peer list from a hybrid overlay management server in response to an overlay network participation request of the peer;
selecting a first peer from the received peer list;
establishing a connection with the selected first peer;
establishing a connection with at least one of second peers, wherein the overlay network participation request is propagated to the second peers;
determining one of the established connections as a primary path; and
performing a communication through the primary path,
wherein the establishing of the connection with the selected first peer comprises:
transmitting a first request message to the selected first peer;
receiving a success response from the selected first peer and adding information of the selected first peer into an outgoing candidate path list of the peer; and
receiving a second request message to establish the connection from the selected first peer.

2. The operating method of claim 1, wherein the peer list comprises peers determined based on a ticket identification (ID) assigned to each of peers remaining in an overlay network, and
the ticket ID corresponds to an order in which each peer participates in the overlay network.

3. The operating method of claim 1, wherein the determining of the one of the established connections comprises:
transmitting a probe message comprising a local timestamp of the peer to each of peers connected to the peer;

receiving a response in which the local timestamp is embedded from each of the connected peers;

calculating a time difference between a timestamp corresponding to a reception time of the received response and the local timestamp included in the received response; and determining the primary path based on the calculated time difference.

4. The operating method of claim 1, wherein:

the first request message comprises at least one of an identifier of the overlay network, a number of peers that are to propagate the first request message, a maximum number of connections of the peer, and address information of the peer, and the second request message comprises at least one of the identifier of the overlay network, an identifier of the selected first peer, and a ticket ID of the selected first peer.

5. The operating method of claim 1, wherein:

the first request message is modified by the selected first peer, and the modified first request message is transmitted to at least one peer connected via a primary path to the selected first peer.

6. The operating method of claim 5, wherein a value of a first parameter in the modified first request message is a value obtained by dividing a result obtained by subtracting a value of a first parameter in the first request message by a predetermined value by a number of peers connected via primary paths to the selected first peer.

7. The operating method of claim 1, further comprising:

when a peer connected via a primary path to the peer is detected to leave, performing a recovery procedure so that an overlay network maintains a spanning tree form.

8. The operating method of claim 7, wherein the performing of the recovery procedure comprises:

when the ticket ID of the peer is higher than the ticket ID of the detected peer, and when the peer does not have a plurality of outgoing candidate paths, sending a request for a second peer list to the hybrid overlay management server;

selecting a third peer from the second peer list, transmitting a request message comprising a recovery field to the selected third peer, and establishing a connection with the selected third peer;

establishing a connection with at least one of fourth peers, propagation of the request message comprising the recovery field being initiated by the selected third peer, and each of the fourth peers corresponding to a peer that receives the propagated request message comprising the recovery field; and determining one of the connection established with the selected third peer and the connection established with at least one of the fourth peers as a recovered primary path of the peer.

9. The operating method of claim 7, wherein the performing of the recovery procedure comprises, when a ticket ID of the peer is higher than a ticket ID of the detected peer, and when the peer has a plurality of outgoing candidate paths, transmitting a primary set message to a peer on an outgoing candidate path with a maximum performance among the outgoing candidate paths.

10. A peer comprising:

a communicator; and a controller configured to receive a peer list from a hybrid overlay management server through the communicator in response to an overlay network participation request of the peer, to select a first peer from the received peer list, to establish a connection with the selected first peer, to establish a connection with at least one of second peers, and to determine one of the established connections as a primary path, wherein the overlay network participation request is propagated to the second peers, and wherein the controller is configured to:

transmit a first request message to the selected first peer, receive a success response from the selected first peer, add information of the selected first peer into an outgoing candidate path list of the peer, and receive a second request message to establish the connection from the selected first peer.

11. The peer of claim 10, wherein the controller is configured to perform a recovery procedure so that an overlay network maintains a spanning tree form when a peer connected via a primary path to the peer is detected to leave.

12. The peer of claim 10, wherein the peer list comprises peers determined based on a ticket identification (ID) assigned to each of peers remaining in an overlay network, and the ticket ID corresponds to an order in which each peer participates in the overlay network.

* * * * *